(12) United States Patent
Bando et al.

(10) Patent No.: US 8,260,325 B2
(45) Date of Patent: Sep. 4, 2012

(54) LOCATION ESTIMATION SYSTEM

(75) Inventors: Mikio Bando, Mito (JP); Katsuaki Tanaka, Hitachinaka (JP); Yukihiro Kawamata, Hitachi (JP); Toshiyuki Aoki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 13/030,237

(22) Filed: Feb. 18, 2011

(65) Prior Publication Data

US 2011/0244881 A1    Oct. 6, 2011

(30) Foreign Application Priority Data

Feb. 25, 2010    (JP) ................... 2010-039533

(51) Int. Cl.
*H04W 4/00* (2009.01)
(52) U.S. Cl. ............ 455/456.6; 455/456.1; 455/456.2; 455/404.2; 455/423
(58) Field of Classification Search .... 455/456.1–456.6, 455/414.2, 423–425, 404.2
See application file for complete search history.

(56) References Cited

U.S. PATENT DOCUMENTS

| | | | |
|---|---|---|---|
| 6,289,280 | B1 | 9/2001 | Fernandez-Corbaton et al. |
| 2009/0243932 | A1* | 10/2009 | Moshfeghi ............... 342/378 |
| 2010/0105409 | A1* | 4/2010 | Agarwal et al. .......... 455/456.1 |
| 2011/0021207 | A1* | 1/2011 | Morgan et al. ........... 455/456.1 |
| 2011/0142016 | A1* | 6/2011 | Chatterjee ............... 370/338 |

FOREIGN PATENT DOCUMENTS

| | | |
|---|---|---|
| EP | 2 136 221 A1 | 12/2009 |
| FR | 2 632 755 A1 | 12/1989 |
| JP | 6-201813 A | 7/1994 |
| JP | 2000-180528 A | 6/2000 |
| JP | 2002-340589 A | 11/2002 |
| JP | 2003-139837 A | 5/2003 |
| JP | 2003-518632 A | 6/2003 |
| JP | 2003-337029 A | 11/2003 |
| JP | 2007-221541 A | 8/2007 |
| JP | 2008-249670 A | 10/2008 |
| JP | 2008-312054 A | 12/2008 |
| JP | 2009-150722 A | 7/2009 |
| WO | WO 01/02875 A2 | 1/2001 |

OTHER PUBLICATIONS

European Search Report dated Jun. 27, 2011 (Seven (7) pages).
Japanese Office Action dated Feb. 28, 2012 with English Translation (six (6) pages).

* cited by examiner

*Primary Examiner* — Wayne Cai
(74) *Attorney, Agent, or Firm* — Crowell & Moring LLP

(57) ABSTRACT

A location estimation system includes: a position measurement unit that receives position measurement signals from a plurality of sources of emission, and calculates position information of a first mobile object; a distance measurement unit that measures a distance from the first mobile object and to a second mobile object; a relationship determination unit that determines presence or absence of a relationship between the first mobile object and the second mobile object based upon relative position of the second mobile object based upon the distance, and selects position measurement signals from sources of emission that are different from the sources of emission of the position measurement signals received by the first mobile object; a position correction unit that corrects a position of the first mobile object based upon the position measurement signals received by the first mobile object and the position measurement signals selected by the relationship determination means.

6 Claims, 11 Drawing Sheets

LOCATION ESTIMATION SYSTEM

INCORPORATION BY REFERENCE

The disclosure of the following priority application is herein incorporated by reference: Japanese Patent Application No. 2010-039533 filed Feb. 25, 2010.

BACKGROUND OF THE INVENTION

1. Field of the Invention

The present invention relates to a location estimation system that can estimate the position of a mobile object both indoors and outdoors.

2. Description of Related Art

Up until the present, in order to obtain the positions of a plurality of mobile objects with good accuracy, various methods have been proposed that employ information relating to the plurality of mobile objects. For example in Japanese Laid-Open Patent Publication 2003-337029 there is proposed a device that calculates the relative positional relationship between one mobile object and another mobile object accurately by utilizing the satellite signals from the per se known GPS (Global Positioning System), and that maps the positions of those mobile objects upon a map by considering their relative positional relationship that has thus been calculated. Furthermore in Japanese Laid-Open Patent Publication 2002-340589 there is described a method in which a base station is installed at a position that is accurately known, an error calculated by subtracting the pseudorange measured at the base station from the pseudorange observed by a GPS terminal is taken as correction information, and, by a VRS information distribution server SS distributing this correction information via a network, the position is corrected on the basis of this correction information that the mobile object receives via the network. And in Japanese Laid-Open Patent Publication 2009-150722 a method is described in which the probability distributions of the positions on Earth of three or more mobile objects are calculated, and thereby the positions of these mobile objects are specified. Moreover in Japanese Laid-Open Patent Publication 2008-312054 a method is described in which the period of a signal is determined using some threshold value, and errors in the detection of GPS signals can be reduced by employing this.

SUMMARY OF THE INVENTION

However, when installing such a base station that is to become a reference for enhancement of GPS position measurement accuracy, there are the problems that it is necessary to consider the installation conditions for this base station, and that the installation can become expensive. If the position is corrected by distributing the correction information via a network in order to reduce the cost owing to installing such a base station, as in the invention described in Japanese Laid-Open Patent Publication 2002-340589, the problem of position measurement accuracy in a location where distance measurement is unstable arises. And even in the case when the position is corrected on the basis of information obtained by a plurality of mobile objects, as in the invention described in Japanese Laid-Open Patent Publication 2009-150722, the problem of position measurement accuracy in a location where distance measurement is unstable again arises if in the actual places of observation it is not possible to observe the signals from four or more GPS satellites at each terminal, since in that case the positions are estimated by the triangulation method.

According to the first aspect of the present invention, a location estimation system comprises: a position measurement unit that receives position measurement signals from a plurality of sources of emission, and calculates position information that includes a first position of a first mobile object and an error estimate of the first position; a distance measurement unit that measures a distance from the first mobile object and to a second mobile object that is different from the first mobile object; a distinctive feature recognition unit that recognizes a distinctive feature of the second mobile object; a transmission unit that transmits the position measurement signals and the position information; a relationship determination unit that acquires relative position of the second mobile object with respect to the first mobile object based upon the distance, determines presence or absence of a relationship between the first mobile object and the second mobile object based upon the relative position, and, in case of the presence of the relationship, selects position measurement signals, among the position measurement signals received by the second mobile object, from sources of emission that are different from the sources of emission of the position measurement signals received by the first mobile object; a calculation unit that calculates a second position for the first mobile object based upon the position measurement signals received by the first mobile object and the position measurement signals selected by the relationship determination unit, and calculates position correction information based upon the first position and the second position; a reception unit that receives the position correction information; a position correction information storage unit that stores the position correction information received by the reception unit; and a position correction unit that corrects the first position based upon the position correction information stored by the position correction information storage unit.

According to the second aspect of the present invention, in the location estimation system according to the first aspect, it is preferred that the relationship determination unit comprises: an association determination unit that determines upon the presence or the absence of the relationship, based upon whether or not the distance measured by the distance measurement unit is measured by a measurement device mounted to the first mobile object or to the second mobile object; a signal independence decision unit that determines upon the independence of the sources of emission of the position measurement signals received by the first mobile object and the position measurement signals received by the second mobile object; and a base line vector calculation unit that calculates a base line vector based upon the relative position.

According to the third aspect of the present invention, in the location estimation system according to the second aspect, it is preferred that the association determination unit classifies into a group a plurality of mobile objects that are subjects for the measurement of the distance from the first mobile object by the measurement device mounted to the first mobile object.

According to the fourth aspect of the present invention, in the location estimation system according to the second aspect, it is preferred that, from among the position measurement signals received by the first mobile object and the position measurement signals received by the plurality of mobile objects that are classified into the group by the association determination unit, the signal independence decision unit distinguishes and selects independent position measurement signals for which the sources of emission are mutually different.

According to the fifth aspect of the present invention, in the location estimation system according to the fourth aspect, it is preferred that the base line vector calculation unit calculates the base line vector if number of the independent position measurement signals selected by the signal independence decision unit is greater than or equal to number needed for position measurement.

According to the sixth aspect of the present invention, in the location estimation system according to the fourth aspect, it is preferred that, after having distinguished and selected the independent position measurement signals, the signal independence decision unit makes a decision as to whether number of unknown variables, among variables giving positions of the plurality of mobile objects classified into the group classified by the association determination unit, is less than or equal to number of the sources of emission that correspond to the independent position measurement signals.

DESCRIPTION OF PREFERRED EMBODIMENTS

The problem that the present invention aims at solving is to enhance the accuracy of position measurement at a location where distance measurement is unstable, for instance because it is alternately possible and not possible to perform position determination by triangulation, without installing a base station to be a reference in order to enhance the accuracy of GPS position measurement.

One mobile object that estimates the position of another mobile object using GPS position measurement or some other triangulation method acquires distance measurement information that has not yet been obtained by the one mobile object for the other mobile object by a means of communication such as from the other mobile object or from a center or the like. The relative distance from the one mobile object to the other mobile object corresponding to the acquired distance measurement information is measured by a distance measurement means. Simultaneous equations are set up by including the measured relative distance or distances between those mobile objects and the results of performing some appropriate conversion upon this distance measurement information that has been acquired. These simultaneous equations are equivalent to simultaneous equations that are set up by acquiring the distance information from the three points. By solving these simultaneous equations, it becomes possible to obtain a position measurement result, and thereby to perform position measurement at a location where distance measurement is unstable.

With a prior art location estimation method that employs triangulation theory, there is the condition that, for one mobile object, it should be possible to perform distance measurement from the positions of at least three points or more. However, according to the present invention, by using the information from a plurality of mobile objects, and moreover by reflecting the relationship between the one mobile object and the plurality of other mobile objects, it becomes possible to perform observation at a total of three or more points including the positions of the plurality of mobile objects, and thus it becomes possible to measure the position of each of the mobile objects, and it becomes possible to maintain the accuracy of position measurement. And, even if it is possible to measure the distances from three or more positions to the position of the one mobile object itself, by acquiring the differences between the distances, and by performing maximum likelihood estimation so as to minimize the error in these measured distances, it is possible to reduce the error that occurs during measurement of the distances from the three points. Due to this, it becomes possible to estimate the position at higher accuracy than the location estimation accuracy due to a single mobile object. In the following, embodiments of the location estimation system according to the present invention will be explained with reference to the figures.

First Embodiment

Figure 1:
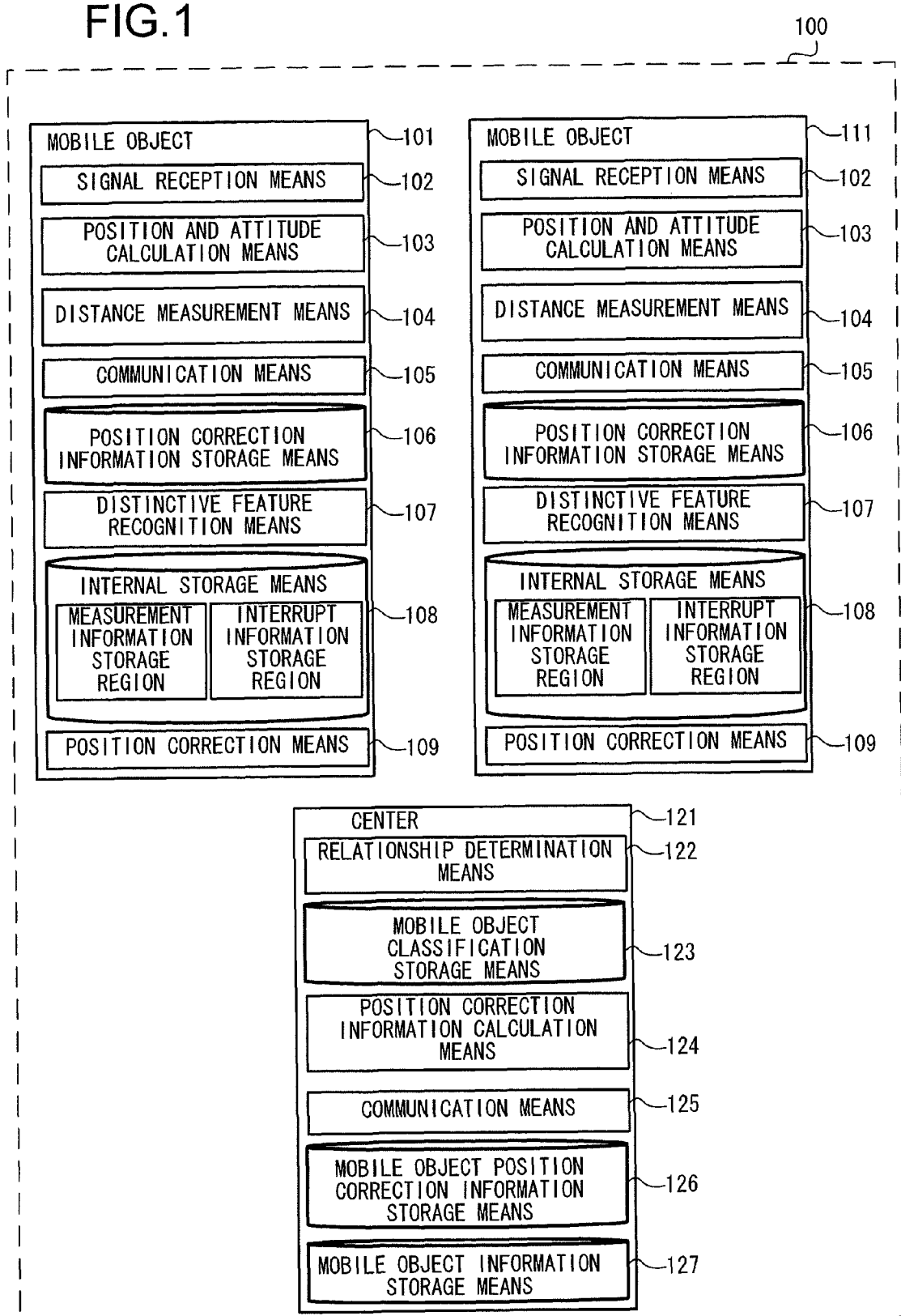
FIG. 1 is a structural diagram showing a location estimation system.

FIG. 1 is a structural diagram of a first embodiment of a location estimation system 100 according to the present invention. According to this first embodiment, the accuracy of position measurement is enhanced in an environment in which one or more specific mobile objects are shifting along a specific travel path such as in a mine or the like and in which it is possible to perform frequent communication between each of the mobile objects and a center, or between the mobile objects themselves.

This location estimation system 100 includes a plurality of mobile objects 101 and 111 and a center 121. It will be supposed that time synchronization to a common time reckoning has been established between the mobile objects 101 and 111 and the center 121. While FIG. 1 shows a simple example in which the location estimation system 100 includes the mobile object 101, the mobile object 111, and the center 121, the number of mobile objects could be greater.

The mobile object 101 includes: a signal reception means 102 that acquires sensor information such as a position measurement signal or the like; a position and attitude calculation means 103 that calculates a position on the basis of sensor information such as this position measurement signal that has been received or the like; a distance measurement means 104 that measures the relative distance between the mobile object 101 and the other mobile object 111; a communication means 105 that communicates to the exterior information from sensors mounted to this mobile object and the position information that has been calculated by the position and attitude calculation means 103; a position correction information storage means 106 that stores position correction information distributed from the center 121; a distinctive feature recognition means 107 that recognizes a distinctive feature of a mobile object that is an opposite party to which the relative distance is measured by the distance measurement means 104; an internal storage means 108 that has a measurement information storage region and an interrupt information storage region; and a position correction means 109 that corrects the position calculated by the position and attitude calculation means 103 on the basis of the position correction information stored by the position correction information storage means 106.

The internal storage means 108 stores in its measurement information storage region sensor information such as position measurement signals and the like received by the mobile object 101 and the time points of acquisition of this sensor information, and also the results of measurements of relative distance and the measurement instants of these relative distance measurements. Moreover, the internal storage means 108 stores certain values part way through transmission to the center 121 in its interrupt information storage region. Moreover, the distance measurement means 104 and the distinctive feature recognition means 107 could also be embodied as a single device, such as a stereo camera, that provides two effects, i.e. the effect of acquiring the distance to a subject body and the effect of acquiring a distinctive feature of that subject body. The mobile object 111 has a similar structure to that of the mobile object 101.

The center 121 includes: a relationship determination means 122 that decides upon the linkages (i.e. the associations) of relative positions and so on of other mobile objects to one mobile object from results of relative distance measurement, including whether or not it is possible to measure distances from a plurality of mobile objects like the mobile object 101 and the mobile object 111 and so on, and the mutual relative distances between the mobile objects; a mobile object classification storage means 123 that stores the information determined upon by the relationship determination means 122; a position correction information calculation means 124 that calculates position correction information for correcting the current position of each mobile object whose current position is ascertained by the center 121; a communication means 125 that performs communication with the mobile objects in order to receive position correction information requests from the mobile objects and in order to transmit position correction information to the mobile objects; a mobile object position correction information storage means 126 that stores the position correction information calculated by the position correction information calculation means 124; and a mobile object information storage means 127 that stores information obtained from the plurality of mobile objects.

Figure 2:
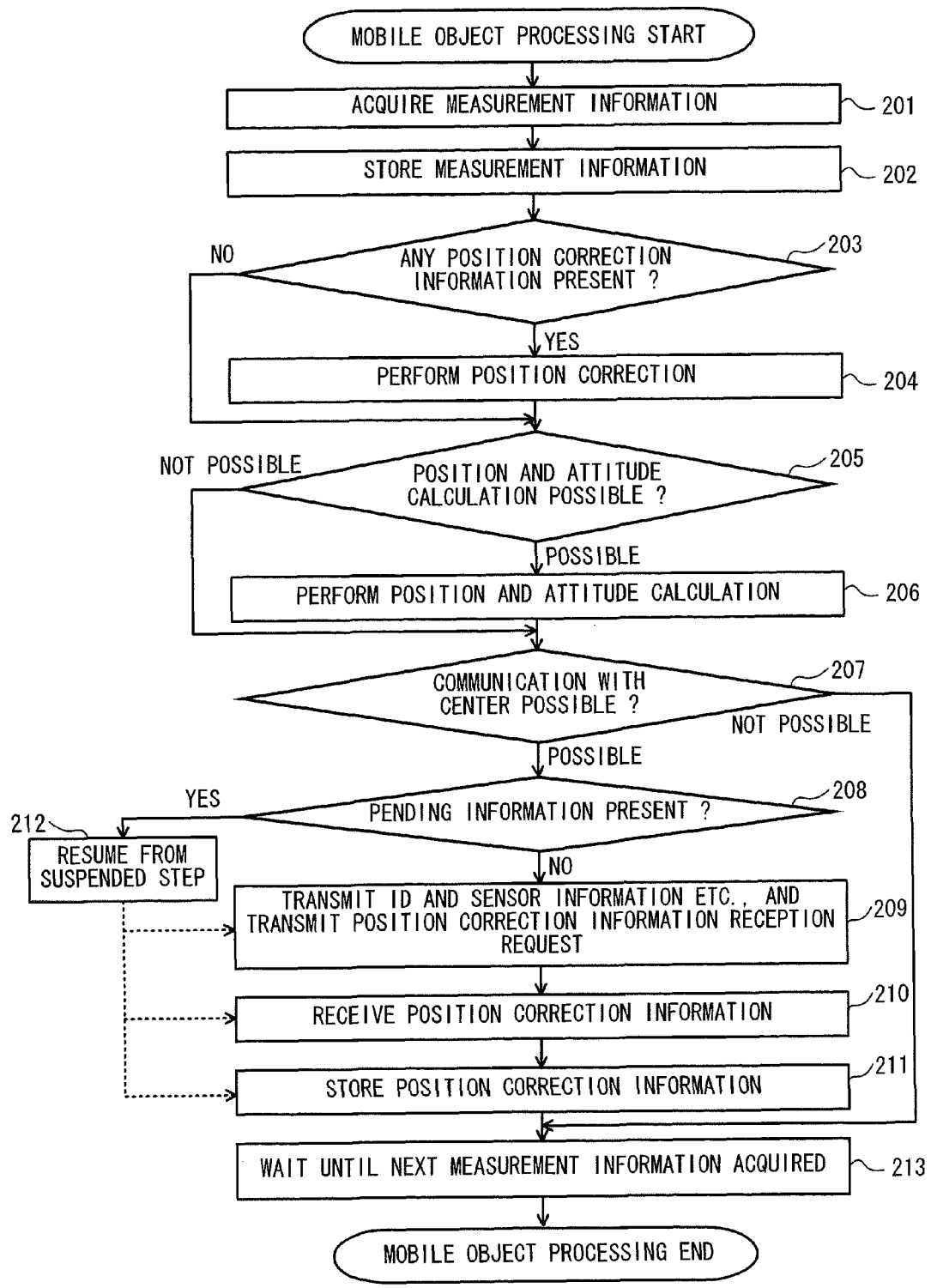
FIG. 2 is a flow chart showing the flow of processing in each of several mobile objects of this system.
Figure 3:
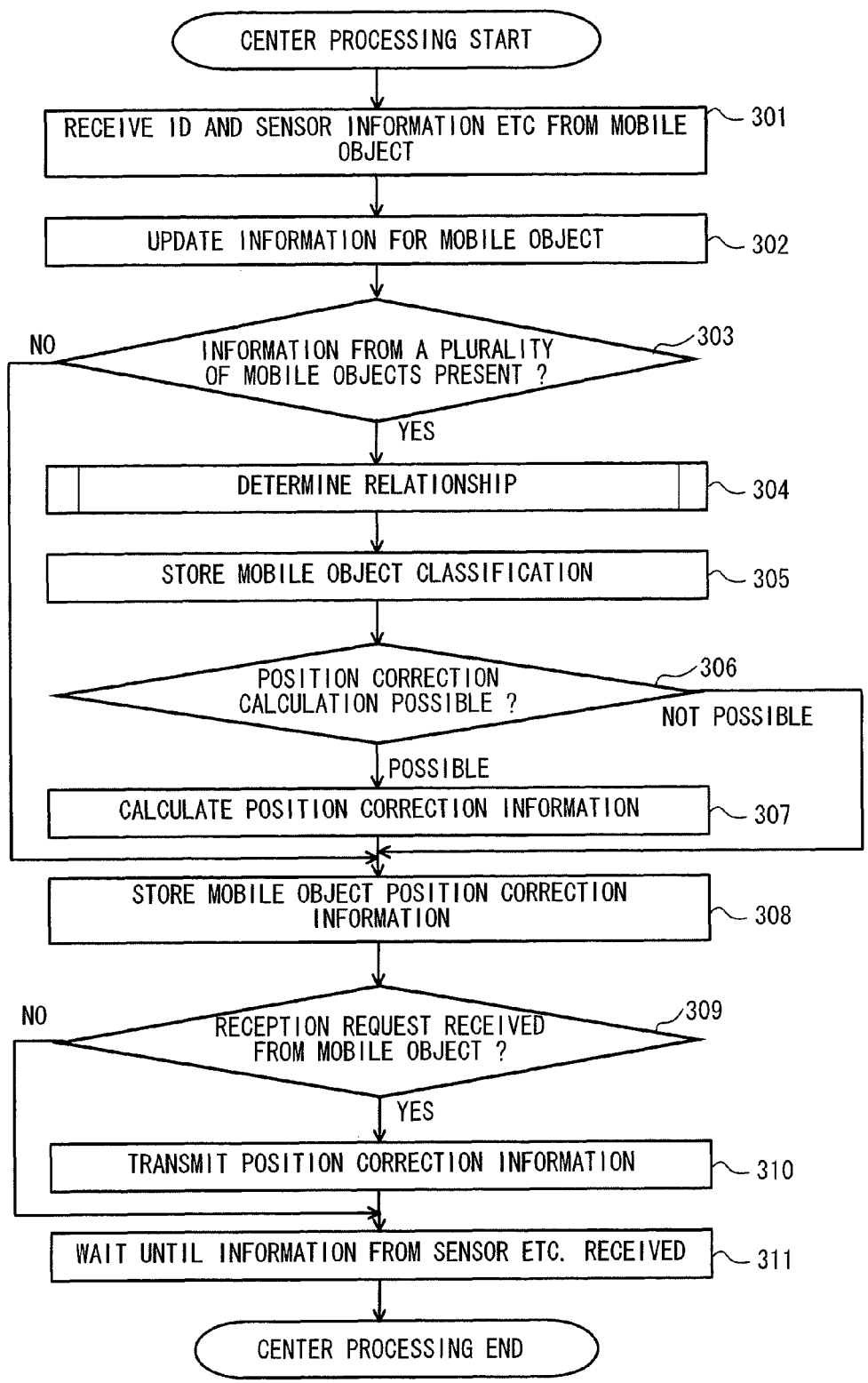
FIG. 3 is a flow chart showing the flow of processing in a center of this system.

The location estimation processing by this location estimation system 100 includes processing that is performed by each of the mobile objects and processing that is performed by the center 121. In this location estimation processing, information both from the mobile objects and from the center 121 is transferred mutually between them and used. FIG. 2 is a flow chart showing the flow of processing in each of the mobile objects of this location estimation system 100. And FIG. 3 is a flow chart showing the flow of processing in the center 121 of this location estimation system 100.

The processing performed by the mobile object 101 will now be explained. In the mobile object 101, sensor information such as a position measurement signal or the like that is obtained by a sensor or the like is acquired by the signal reception means 102 on a predetermined cycle. And the internal storage means 108 stores in advance distinctive features of the mobile objects recognized by the distinctive feature recognition means 107. The distinctive feature recognition means 107 scans around the vicinity of the mobile object 101, recognizes the distinctive features of other mobile objects, and stores these distinctive features that it has recognized in the internal storage means 108. Such distinctive features of each of the mobile objects may include a laser-reflective plate mounted upon the mobile object, a distinctive pattern or mark, or the shape of the mobile object or the like; and these distinctive features are stored in advance in the internal storage means 108 in correspondence with each of the mobile objects. In this first embodiment of the present invention, the distinctive feature of the other mobile object 111 is stored as being that of that other mobile object from the point of view of the mobile object 101. These distinctive features are converted to converted values by some conversion method that is determined in advance according to a rule. Distinctive amounts are recognized, including these converted values and the directions in which the distinctive features have been recognized. In a step 201, the relative distance to a distinctive feature included in these recognized distinctive amounts is measured by the distance measurement means 104.

In a step 202, the sensor information and its acquisition time point, the relative distance that was measured, and also the distinctive amounts that were recognized in the step 201 are stored as measurement information in the measurement information storage region of the internal storage means 108. Even if any information stored in the measurement information storage region remains from the previous episode, it is overwritten.

Then in a step 203 the position correction means 109 checks whether or not there is any position correction information in the position correction information storage means 106, and if there is, then the flow of control proceeds to a step 204 in which the current position is corrected by using that position correction information. But, if there is no such position correction information, then the flow of control is transferred to a step 205. In this step 205, the position and attitude calculation means 103 makes a decision as to whether or not it is possible to calculate the position and attitude using the measurement information stored in the step 202. If it is possible, then in a step 206 the position and attitude calculation means 103 calculates the position and attitude. The details of this calculation will be described hereinafter. But if it is not possible, then the flow of control is transferred to a step 207.

In this step 207, the communication means 105 decides whether or not communication between the mobile object 101 and the center 121 is possible. If communication with the center 121 is not possible, then the flow of control is transferred to a step 213, and the flow of this processing waits until measurement information is acquired in the next episode. But if communication with the center 121 is possible, then the flow of control proceeds to a step 208. In this step 208, a decision is made as to whether or not there is any information relating to processing in an interrupt information storage region of the internal storage means 108 that will be described hereinafter, that was left pending by the processing from the step 209 to the step 211 during a previous episode. If there is no such interrupt information, then in a step 209 a request for reception of position correction information is transmitted to the center 121 by the communication means 105, along with the sensor information and the acquisition time point of that sensor information that were stored in the step 202, the mobile object ID of the mobile object 101 itself, and also the relative distance between the mobile object 101 and the other mobile object 111 and its distinctive amounts as recognized by the distinctive feature recognition means 107. As a response from the center 121 to this position correction information reception request transmitted to the center in the step 209, the position correction information is transmitted that corresponds to the ID of the mobile object 101 for which the reception request was transmitted. Then in a step 210 this position correction information is received by the communication means 105. And in a step 211 the position correction information that was received in the step 210 is stored in the position correction information storage means 106. Finally in a step 213 the flow of control waits until the next acquisition of measurement information in the next episode.

If, at any time during the processing at or subsequent to the step 207, the next opportunity arrives for measurement information acquisition, then the processing flow is suspended, and the processing for measurement information acquisition in the step 201 and the processing for storage of the measurement information in the step 202 are performed. In order to do this, the information that remains pending for the uncompleted processing is stored in the interrupt information storage region of the internal storage means 108, and then the flow of control returns to the step 201. And in the processing of the step 208 that is performed thereafter, if it is decided that pending information is present in the interrupt information storage region of the internal storage means 108, then the corresponding processing is resumed from the step that was suspended on the basis of this pending information (a step 212). Processing similar to that of the mobile object 101 is performed by the mobile object 111.

FIG. 3 shows the flow of processing in the center 121. In a step 301, the communication means 125 receives the information that was transmitted from the mobile object 101 in the step 209 of the processing flow shown in FIG. 2. Then in a step S302 the mobile object information storage means 127 stores the sensor information and its time point of acquisition, the relative distance between the mobile object 101 and the other mobile object 111, and information about the distinctive amounts, received by the communication means 125 from the mobile object 101. And, among the information from the mobile object 101 that is stored in the mobile object information storage means 127, that information for which some fixed time period or longer has elapsed from when it was stored is deleted. If information is present that corresponds to the same mobile object ID, that information is overwritten.

Then in a step S303 a decision is made as to whether or not information from a plurality of mobile objects is stored in the mobile object information storage means 127. If there is only information from a single mobile object, then the flow of control is transferred to a step 308, and the mobile object position correction information storage means 126 stores "no correction information" for all of the mobile object IDs that are registered in advance as subjects for management. But if there is information from a plurality of mobile objects, then the flow of control proceeds to a step 304, in which the relationships of the plurality of mobile objects are determined by the relationship determination means 122, and mobile object classification information is outputted in which the mobile objects for which there is a certain relationship are classified together into one group. Then in a step 305 this mobile object classification information is stored in the mobile object classification storage means 123 along with the various mobile object IDs.

Then in a step 306, on the basis of the mobile object classification information stored by the mobile object classification storage means 123, a decision is made by the position correction information calculation means 124 as to whether or not it is possible to calculate position correction information. Among the position measurement signals included in the sensor information received by the communication means 125, the position correction information calculation means 124 obtains the number of independent position measurement signals, and the number of unknown position variables to be obtained for the mobile objects. The number of independent position measurement signals and the number of unknown position variables to be obtained for the mobile objects obtained in this manner are compared together, and, if the number of independent position measurement signals is less than the number of unknown position variables to be obtained for the mobile objects, then the position correction information calculation means 124 decides that calculation of position correction information is not possible. In this case the flow of control is transferred to the step 308, and the mobile object position correction information storage means 126 stores "no correction information" for all of the mobile object IDs.

But if, on comparing together the number of independent position measurement signals and the number of unknown position variables to be obtained for the mobile objects, it is found that the number of independent position measurement signals is greater than or equal to the number of unknown position variables to be obtained for the mobile objects, then the position correction information calculation means 124 decides that it is possible to calculate position calculation information. The flow of control proceeds to a step 307, in which the position correction information calculation means 124 calculates position correction information. And then in the step 308 the mobile object position correction information storage means 126 stores the position correction information calculated in the step 307 for each of the mobile object IDs.

In a step 309, the communication means 125 decides whether or not there is a reception request for position correction information from a mobile object. If there is such a reception request, then in a step 310 the communication means 125 transmits position correction information corresponding to the mobile object ID of the mobile object that transmitted this reception request. But if no reception request is received from a mobile object, then in a step 311 the processing flow enters a wait state and waits until the next item of information is received. The processing flows in the mobile objects and the processing flow in the center 121 operate in parallel.

Since in this manner the center proceeds to correct the location estimation result for each of the mobile objects as opportunity offers, accordingly it is possible to enhance the positional accuracy, even in a location in which the distance measurement used in position determination by triangulation of GPS position measurements or the like is unstable.

The structures of the various devices in the mobile object will now be explained. The signal reception means 102 in the mobile object receives signals for calculating the positions of each of the mobile objects, in other words signals for calculating their positions by triangulation, and signals from sensors for detecting the attitude and the speed of the mobile object. These signals for calculating the positions by triangulation are obtained from the navigation radio wave from a GPS satellite, or distance information from a landmark. The sensors for detecting the attitude of the mobile object may include a relative sensor such as a gyro sensor, an acceleration sensor, or the like, and/or a sensor that gives absolute orientation such as a geomagnetism sensor or the like. And the sensor for detecting speed may include a tire encoder, a GPS sensor that provides speed information, a Doppler speedometer, or the like.

In the step 206 of FIG. 2, the position and attitude calculation means 103 calculates the position of the mobile object on the basis of the sensor information that has been received by the signal reception means 102. For example, the signals from N satellites may be received, and, on the basis of triangulation of the GPS signals, from the position $(X_i, Y_i, Z_i)$ of the i-th satellite, the position (x, y, z) of the mobile object that is the subject of calculation, and the distance $r_i$ from the i-th satellite and its error s, the simultaneous equations shown in Equations (1) below may be set up. By solving these simultaneous equations, it is possible to calculate the position (x, y, z) of the mobile object.

$$\begin{cases} r_1 = \sqrt{(X_1-x)^2+(Y_1-y)^2+(Z_1-z)^2} + s \\ r_2 = \sqrt{(X_2-x)^2+(Y_2-y)^2+(Z_2-z)^2} + s \\ \vdots \\ r_N = \sqrt{(X_N-x)^2+(Y_N-y)^2+(Z_N-z)^2} + s \end{cases} \quad \text{(Equations 1)}$$

A probability model filter such as a Kalman filter or the like is used in this position and attitude calculation, in consideration of the position calculated by Equations (1) and the accompanying positional measurement error. Along with maximum likelihood location estimation being performed on the basis of the signals received by the signal reception means 102 in this manner, the error thereof is estimated stochastically.

The distance measurement means 104 of the mobile object 101 measures the distance from its own mobile object 101 to another mobile object 111 using a sensor or the like. The sensor for thus measuring the relative distance may include a stereo camera, a laser rangefinder, a millimeter wave radar, and/or the like.

The internal storage means 108 stores in advance a distinctive feature for the other mobile object 111 recognized by the distinctive feature recognition means 107. This distinctive feature recognition means 107 of the mobile object scans the vicinity around its own mobile object 101, recognizes the distinctive feature of the other mobile object 111, and searches in the internal storage means 108 for this distinctive feature that it has recognized. And, as distinctive amounts, the distinctive feature recognition means 107 recognizes this distinctive feature and the direction of the mobile object 111 that possesses this distinctive feature with respect to its own mobile object 101. The sensor for thus performing distinctive feature recognition may include a camera, a 3D laser rangefinder, and/or the like.

The communication means 105 of the mobile object transmits to the center 121 the information obtained by the signal reception means 102, by the position and attitude calculation means 103, and by the distance measurement means 104 of the mobile object. And the communication means 105 receives information sent from the center 121.

The position correction information storage means 160 stores position correction information from the center 121 that has been received by the communication means 105. The position correction information that is stored here is deleted after position correction has been performed.

Figure 4:
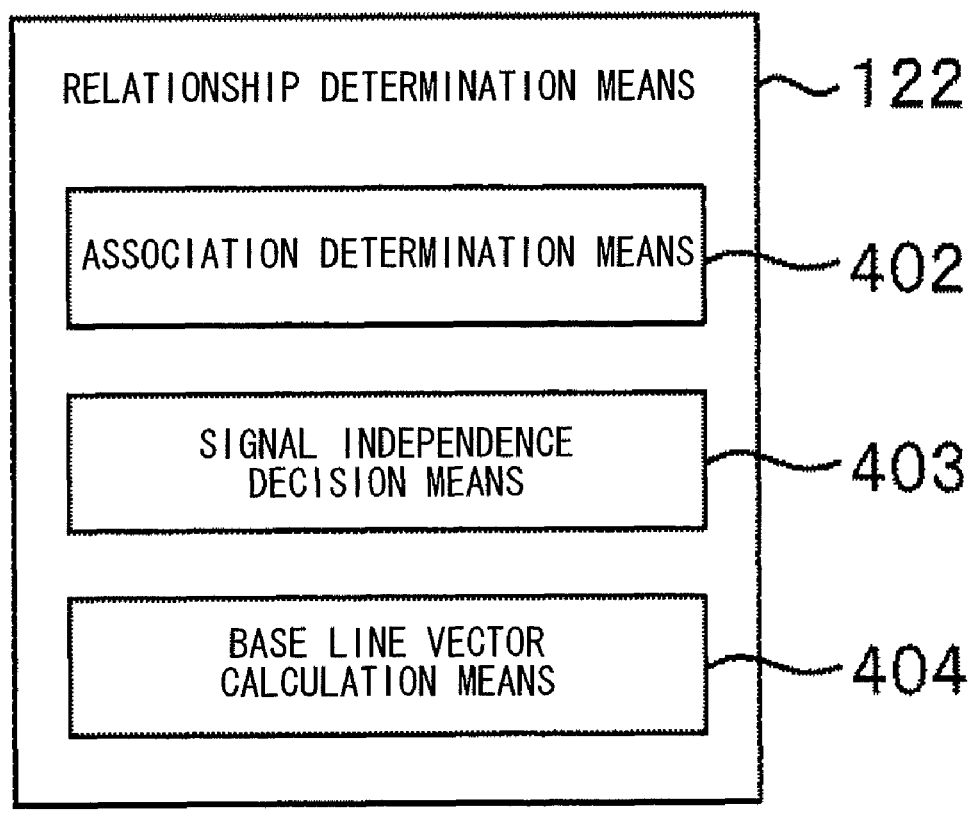
FIG. 4 is a structural diagram showing a relationship determination means.
Figure 5:
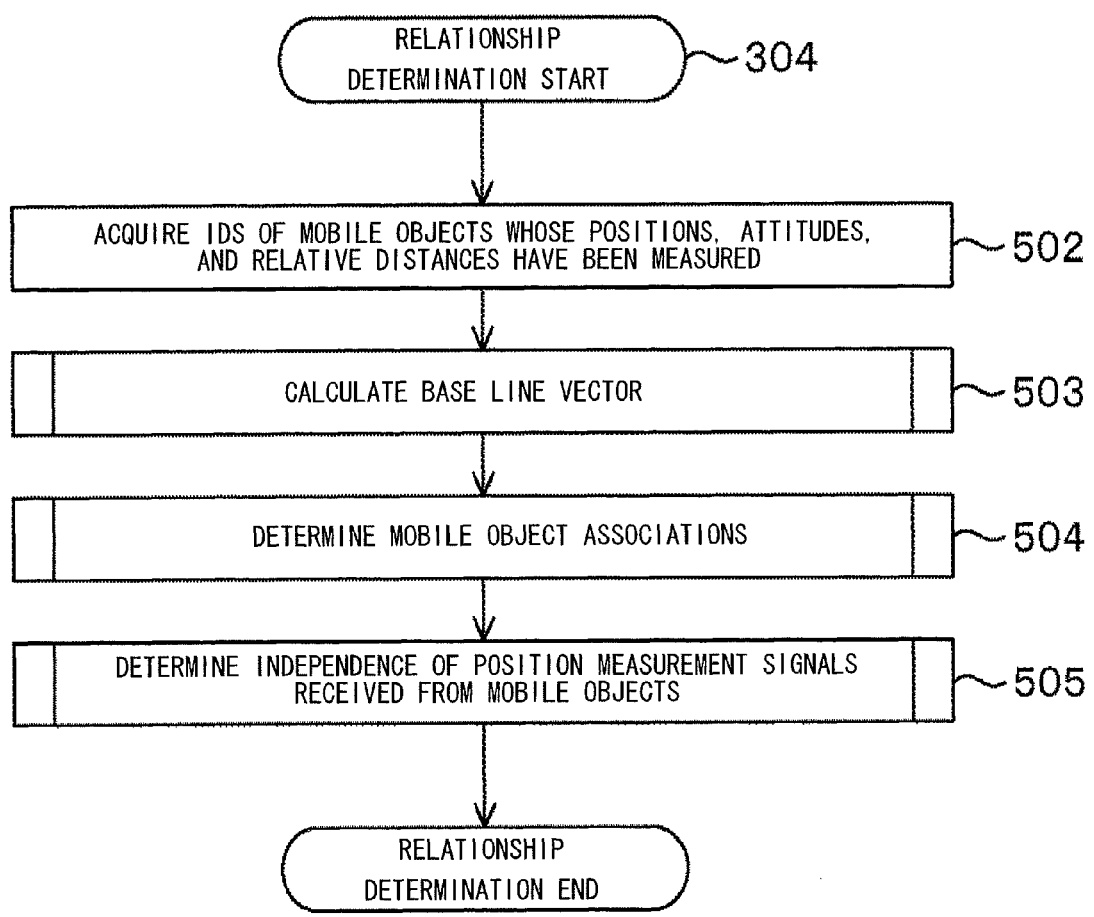
FIG. 5 is a flow chart showing the flow of processing performed by this relationship determination means.

The structures of the various devices in the center 121 will now be explained. The relationship determination means 122, along with determining the relationships between the plurality of mobile objects and classifying those mobile objects having a certain relationship all together as a group, also calculates the position of each of the mobile objects on the basis of each and every one of the position coordinates and also the relative distances and so on between the various mobile objects. FIG. 4 shows the detailed structure of this relationship determination means 122. And FIG. 5 shows the flow of processing executed by the relationship determination means 122. The relationship determination means 122 includes an association determination means 402, a signal independence decision means 403, and a base line vector calculation means 404.

The information measured by the distance measurement means 104 of the mobile object 101 is received by the communication means 125. And, on the basis of this information received by the communication means 125, the association determination means 402 determines, for each pair of mobile objects between which the relative distance is already known, that "they are associated" (i.e., that an association exists); while, for each pair of mobile objects between which the relative distance is unknown, it determines that "they are not associated" (i.e., that no association exists).

The sensor information obtained by the signal reception means of the mobile object 101 is received by the communication means 125. And the signal independence decision means 403 makes a decision as to whether the position measurement signal included in the sensor information received by the communication means 125 is a signal from an independent source of emission, or is a signal from a source of emission that is the same as the source of emission of some other position measurement signal.

Moreover, the base line vector calculation means 404 calculates the relative heights of the various mobile objects, on the basis of the result of calculation of at least one of the sensor information obtained by the signal reception means 102 of the mobile object 101, and the information measured by the distance measurement means 104.

In the step 303 of FIG. 3 the fact is verified that data is being received by the communication means 125, including mobile object IDs for identifying each of the plurality of mobile objects individually, sensor information obtained from each of the mobile objects, their relative distances, and their distinctive amounts. This verification is a precondition for starting of the relationship determination processing by the relationship determination means 122. A mobile object ID is assigned to each of the mobile objects in advance. In the step 502 of FIG. 5, the relationship determination means 122 acquires from the mobile object information storage means 127 the mobile object IDs of the plurality of mobile objects whose sensor information and relative distances have been measured. In the step 503, the relationship determination means 122 acquires from the mobile object information storage means 127 the relative distances and the distinctive amounts of the plurality of mobile objects. The direction of each of the plurality of mobile objects with respect to the mobile object 101 is included in these distinctive amounts. On the basis of the relative distances and the distinctive amounts of the plurality of mobile objects, the relationship determination means 122 calculates a base line vector from a reference ground point representing the position of the mobile object 101 whose relative distance has been measured to the ground point at which the mobile object that is the subject of relative positional measurement to this reference ground point is positioned.

Figure 6:
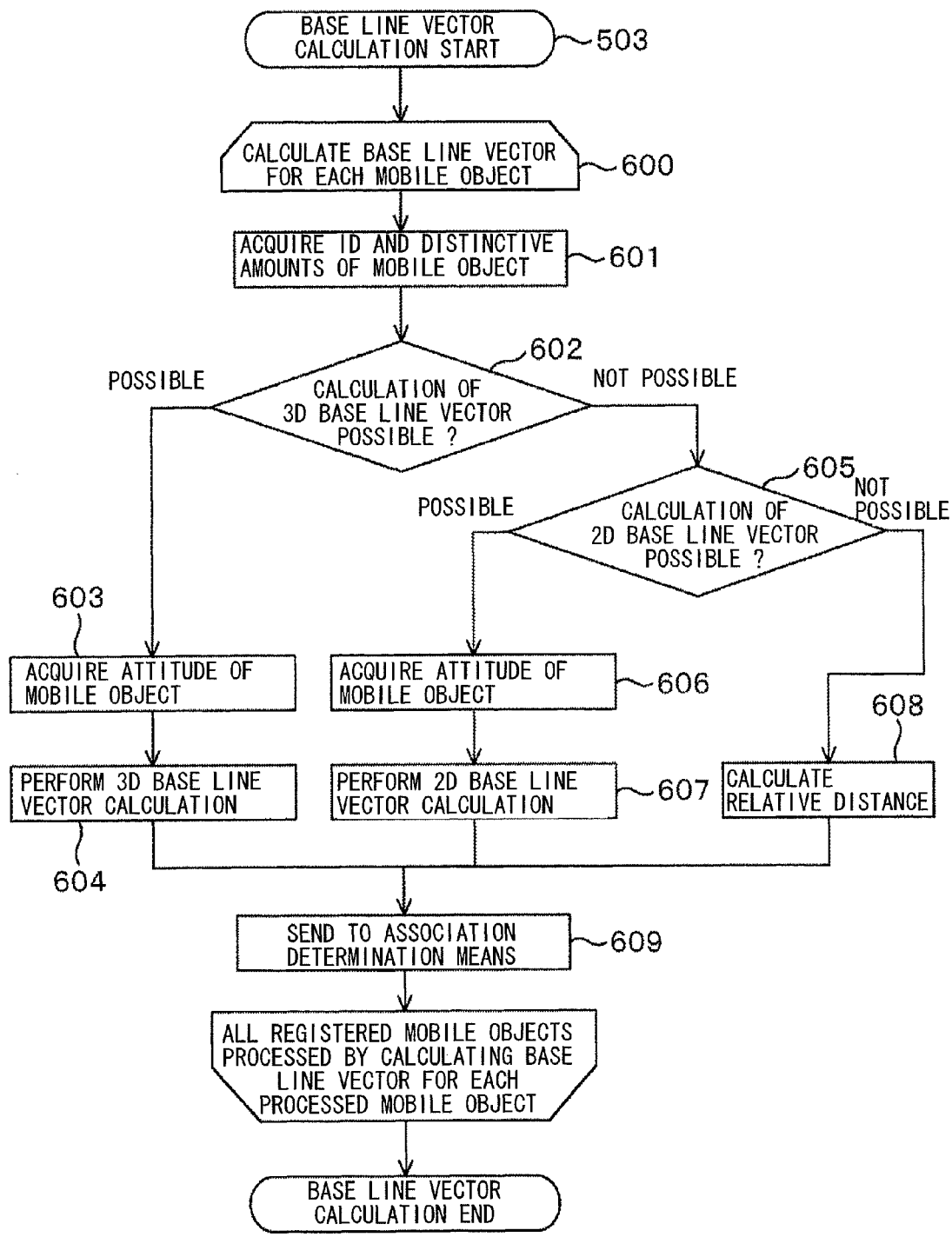
FIG. 6 is a flow chart showing the flow of processing performed by a base line vector calculation means.

FIG. 6 shows the detailed flow of processing of this base line vector calculation. The information acquired from the mobile object is stored in the mobile object information storage means 127 in the step 502. Loop processing (a step 600) is executed for all of the mobile objects corresponding to the information stored in the mobile object information storage means 127, and this includes the steps 601 through 609 explained below. In a step 601, the base line vector calculation means 404 chooses one mobile object for which the base line vector calculation has not yet been performed, and acquires from the mobile object information storage means 127 the distinctive amounts that correspond to the ID of this chosen mobile object. When, among the measurement information that is included in the information from the mobile object, the information about direction included in these distinctive amounts includes information about the angles in the height direction and in the horizontal direction with respect to the direction of progression of the mobile object, then it is possible to calculate a 3D base line vector. In a step 602, the base line vector calculation means 404 decides whether or not it is possible to perform calculation of a 3D base line vector. This calculation of a 3D base line vector may be performed according to measurements by a stereo camera or a 3D laser rangefinder or the like. If it has been determined that calculation of a 3D base line vector is possible, then in a step 603 the base line vector calculation means 404 acquires the information about the attitude of the mobile object within the measurement information included in the information from the mobile object. And in a step 604 the base line vector calculation means 404 calculates a 3D base line vector on the basis of the result of acquisition of the attitude information of the mobile object in the step 603 and the distinctive amounts that were acquired in the step 601. Then in a step 609 the base line vector calculation means 404 sends the base line vector that was calculated in the step 604 to the association determination means 402 as relative distance information, along with the ID of the mobile object that is to be taken as the reference.

But if it is decided in the step 602 that calculation of a 3D base line vector is not possible, then the flow of control is transferred to a step 605. When the information about direction included in the distinctive amounts acquired in the step 601 includes information about the angle in the horizontal direction with respect to the direction of progression of the mobile object, then it is possible to calculate a 2D base line vector. In a step 605, the base line vector calculation means 404 decides whether or not it is possible to perform calculation of a 2D base line vector. This calculation of a 2D base line vector may be performed according to measurements by a laser rangefinder or the like. If it has been determined that calculation of a 2D base line vector is possible, then in a step 606 the base line vector calculation means 404 acquires the information about the attitude of the mobile object within the measurement information included in the information from the mobile object. And in a step 607 the base line vector calculation means 404 calculates a 2D base line vector on the basis of the result of acquisition of the attitude information of the mobile object in the step 606 and the distinctive amounts that were acquired in the step 601. Then in a step 609 the base line vector calculation means 404 sends the base line vector that was calculated in the step 607 to the association determination means 402 as relative distance information, along with the ID of the mobile object that is taken as the reference.

If in the step 605 it has been decided that the calculation of a 2D base line vector is not possible, then in a step 608 the base line vector calculation means 404 calculates only the relative distance between the two end points of the base line vector, while abandoning the idea of calculating the direction between them. If the relative distance has already been calculated, then this relative distance is used. And in the step 609, the base line vector calculation means 404 sends this relative distance to the association determination means 402, along with the ID of the mobile object that is taken as the reference.

The loop processing of the step 600 explained above is repeatedly performed until, for all of the mobile objects corresponding to the information from mobile objects stored in the mobile object information storage means 127 and acquired in the step 502, there are no more unprocessed mobile objects.

Figure 7:
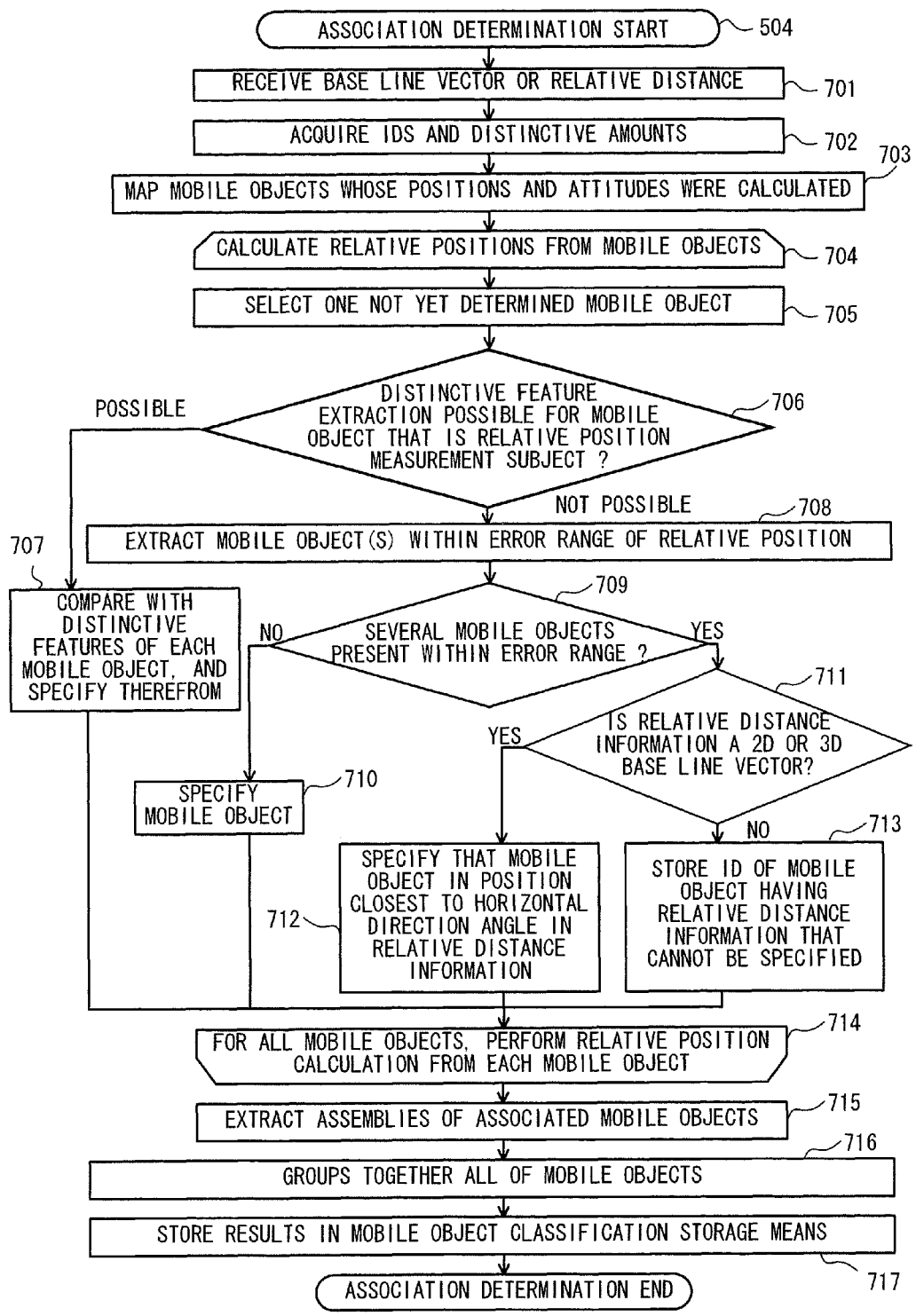
FIG. 7 is a flow chart showing the flow of processing performed by an association determination means.

The explanation now returns to FIG. 5. The information that has been measured by the distance measurement means 104 of the mobile object 101 is received by the communication means 125 of the center 121. In a step 504, on the basis of the information received by the communication means 125 of the center 121, the association determination means 402 included in the relationship determination means 122 determines whether each pair of mobile objects forming a group is a pair between which the relative distance is already known so that "they are associated" (i.e., an association exists), or is a pair between which the relative distance is unknown so that "they are not associated" (i.e., no association exists). FIG. 7 shows the processing flow for this association determination by the association determination means 402.

In a step 701, the association determination means 402 receives the 3D or 2D base line vector determined in the step 503 or the relative distance, and the mobile object ID of the mobile object that is being referred to. Then in a step 702 the association determination means 402 acquires from the mobile object information storage means 127 the positions and attitudes of the mobile objects that correspond to all of the mobile object IDs acquired in the step 502 of FIG. 5, and the relative distances measured by each of these mobile objects and the distinctive amounts of the subject mobile object. And then in a step 703 the association determination means 402 maps in 3D space those mobile objects, among the mobile objects that correspond to the information acquired in the step 702, for which calculation of the position and attitude has been performed.

By doing the above, and by taking each of the mobile objects as the subject, the relative positions of the other mobile objects are measured on the basis of their 3D or 2D base line vectors or their relative distances. This type of processing to establish mutual correlations with the mobile objects that are the relative position measurement subjects is repeated in the step 704. The step 704 includes the steps 705 through 714 explained below. In the step 705, the association determination means 402 selects, from among the not yet processed mobile objects among the mobile objects that are registered in the mobile object information storage means 127, one mobile object to be the subject for processing.

Then in a step 706 the association determination means 402 decides whether or not it is possible to extract the distinctive feature of the mobile object that is the subject for relative position measurement. It is decided that it is possible to extract the distinctive feature of the mobile object if the mobile object that is to be measured has a laser reflective plate or the like and its reflection off it has been measured with a laser rangefinder, or if each of the mobile objects has a mark with a distinctive pattern and it has been possible to recognize that pattern with a stereo camera, or the like. If it has been decided that such distinctive feature extraction is possible, then in a step 707 the association determination means 402 compares this distinctive feature with the distinctive features of each of the mobile objects that have been determined in advance, specifies therefrom the mobile object for which the relative position has been measured, and decides that there is an association between the mobile object selected as the processing subject and this specified mobile object.

If in the step 706 it is decided that distinctive feature extraction is not possible, then the flow of control is transferred to a step 708, in which the association determination means 402 extracts, from the mobile object information storage means 127, those one or more mobile objects that are present within the error range of the measured relative position. It is decided that distinctive feature extraction is not possible if, for example, there is no mobile object that has been the subject of relative position measurement, in other words if it has not been possible to measure any other mobile object, or the like. If the position of the mobile object that has been selected as the processing subject has not been calculated, then it will be supposed that no mobile object is present within the error range. Then in a step 709 it is decided whether or not there are a plurality of mobile objects present within the error range of relative distance. If there is only one mobile object that has been extracted, or not even one, then the flow of control proceeds to a step 710. If there is one mobile object that has been extracted, then in the step 710 the association determination means 402 specifies this mobile object whose relative position has been measured, and decides that there is an association between the mobile object selected as the processing subject and this specified mobile object. But if there is not even one mobile object that has been extracted, then the processing for this mobile object that was selected as the processing subject terminates.

However, if in the step 709 a plurality of mobile objects were extracted, then the flow of control is transferred to a step 711, in which the association determination means 402 decides whether or not the relative position information that has been measured is information relating to a 2D or 3D base line vector. If it is information relating to a 2D or 3D base line vector, then the flow of control proceeds to a step 712, in which the association determination means 402 specifies that mobile object that is in a position most close to the angle in the horizontal direction included in the relative distance information as being the mobile object whose relative position has been measured, and decides that there is an association between the mobile object selected as the processing subject and this specified mobile object. But if the information relating to the relative position is one-dimensional information, in other words if it is only information about the relative distance, then no direction of the mobile object selected as the processing subject is specified from the mobile object that is to be a reference. Due to this, this mobile object that is the processing subject is not specified as a mobile object whose relative position has been measured. Then in a step 713 the mobile object ID of this mobile object that cannot be specified and that has this relative distance information is stored. And then in a step 714 the association determination means 402 checks that the decision described above has been performed for all of the mobile objects, and repeats the processing of the steps 705 through 713 if any mobile object remains for which that decision has not been performed.

If it has been decided in the step 714 that the loop processing of the steps 705 through 714 has been performed for all of the mobile objects, then the flow of control proceeds to a step 715, in which the association determination means 402 extracts assemblies(pairs) of mobile objects that have been determined to be associated. Then in a step 716 the association determination means 402 amalgamates together, as a single group, those assemblies(pairs) of a plurality of mobile objects that have in common at least one mobile object, among the mobile objects included in the various groups extracted in the step 715. In this manner, the association determination means 402 groups together all of the mobile objects into a plurality of groups. And finally in a step 717 the association determination means 402 stores the results of grouping in the step 716 in the mobile object classification storage means 123.

The concept of the processing in the step 716 will now be explained, in which the association determination means 402 groups the plurality of mobile objects. It will be supposed that it is possible for the relative distance from a mobile object A to a mobile object B to be measured by a measurement device that is mounted to the mobile object A. Since the mobile object A and the mobile object B form an assembly of mobile objects CL1 for which it has been decided that they are mutually associated, accordingly in the step 715 this assembly of mobile objects CL1 is extracted. Moreover, it will also be supposed that it is possible for the relative distance from the mobile object B to a mobile object C, and also the relative distance from the mobile object B to a mobile object D, to be measured by a measurement device that is mounted to the mobile object B. Since the mobile object B, the mobile object C, and the mobile object D form an assembly of mobile objects CL2 for which it has been decided that they are mutually associated, accordingly in the step 715 this assembly of mobile objects CL2 is extracted. And it will also be supposed that it is possible for the relative distance from a mobile object E to a mobile object F to be measured by the mobile object E. Since the mobile object E and the mobile object F form an assembly of mobile objects CL3 for which it has been decided that they are mutually associated, accordingly in the step 715 this assembly of mobile objects CL3 is extracted.

At this time, each of the relative distances between the mobile object A, the mobile object B, the mobile object C, and the mobile object D comes to be measured directly or indirectly. Since the mobile object B is common to the mobile objects A and B included in the assembly of mobile objects CL1 that was extracted in the step 715, and to the mobile objects A, B, and C included in the assembly of mobile objects CL2 that was extracted in the step 715, accordingly the association determination means 402 amalgamates the assemblies of mobile objects CL1 and CL2 into one group. In other words, the association determination means 402 decides that the mobile objects A, B, C, and D that are included in the two assemblies of mobile objects CL1 and CL2 are all mutually associated, and thus decides that the mobile objects A, B, C, and D should form a single group. And, since the relative distance between the mobile object E and the mobile object F is measured directly, the association determination means 402 decides that the mobile objects E and F are mutually associated, and that the mobile objects E and F should thus form a group. However, since no relative distance between any member of the group that includes the mobile object A and any member of the group that includes the mobile object E has been measured either directly or indirectly, accordingly it is decided that those two groups should remain as separate groups.

Figure 8:
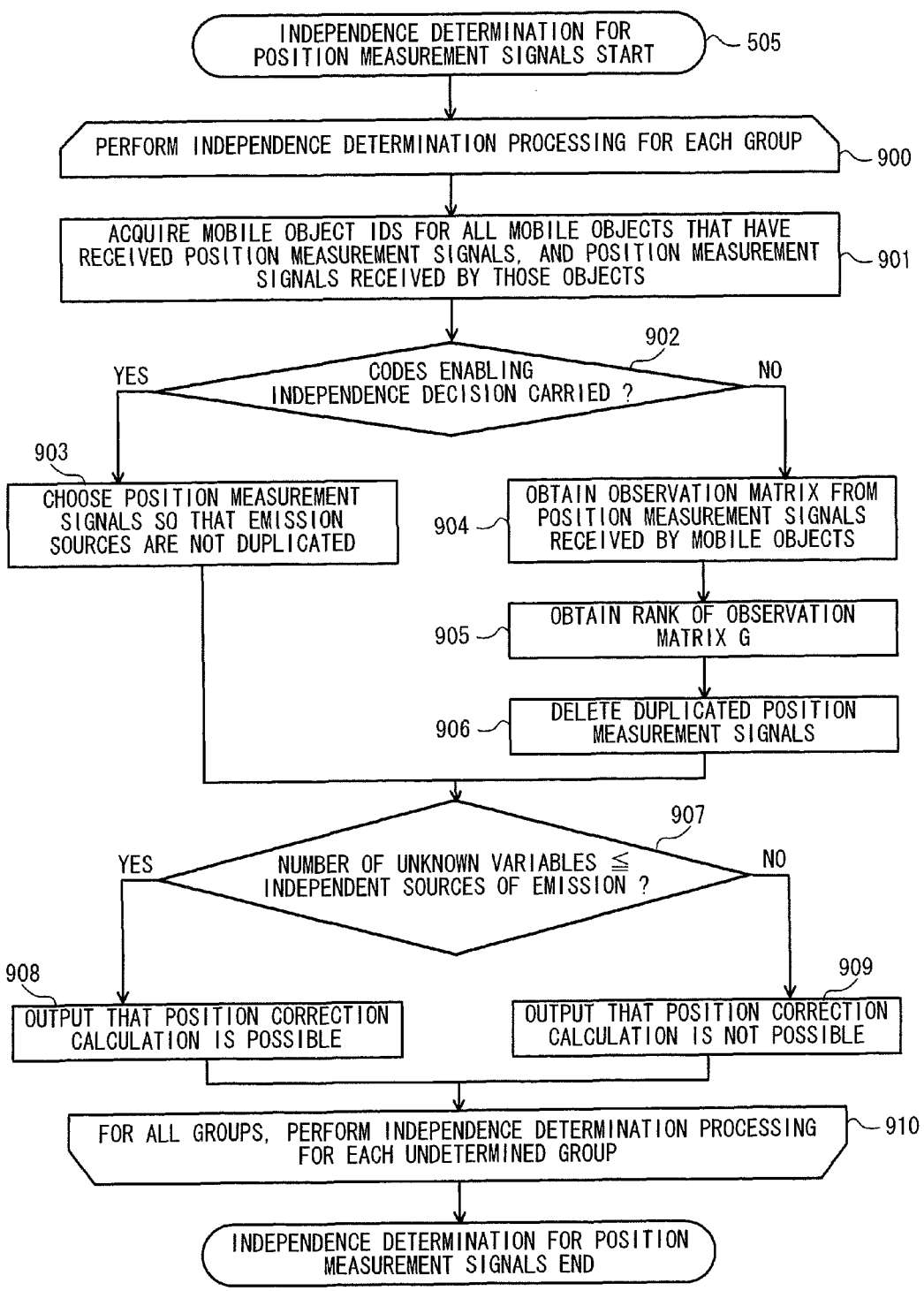
FIG. 8 is a flow chart showing the flow of processing performed by a signal independence decision means.

In a step 505 of FIG. 5, the signal independence decision means 403 makes a decision as to whether or not the position measurement signals that are included in the signals from the sensors and so on obtained by the signal reception means 102 of each of the mobile objects included in the same group are information from sources of emission that are independent. It is supposed that a signal emitted from a position measurement satellite as a source of emission is unique and independent of signals emitted from other sources of emission. FIG. 8 shows the flow of the processing performed by the signal independence decision means 403.

In this processing, processing for each of the groups that were grouped by the association determination means 402 is performed for all of the groups (a step 900). For each of the groups, the processing of steps 901 through 909 is performed. In a step 901, for all of the mobile objects that have received position measurement signals required for performing triangulation, the signal independence decision means 403 reads out their mobile object IDs, and the position measurement signals included in the sensor information received from the mobile objects that have those mobile object IDs. Then in a step 902 the signal independence decision means 403 decides whether or not any codes that enable an independence decision to be made are included in those position measurement signals that have been read out. Codes that could enable such an independence decision could be identification codes such as GPS PN codes. A technique such as that described in Japanese Laid-Open Patent Publication 2008-312054 is used for handling PN codes. If there is some code of this type in the position measurement signal specifying its source of emission, then, in order directly to decide upon the independence of the source of emission, in a step 903, the signal independence decision means 403 chooses a plurality of the position measurement signals so that there is no mutual overlapping of the codes included in the position measurement signals that have been received, in other words so that their sources of emission are not duplicated.

If no codes that can enable an independence decision are included in the position measurement signals that have been received, then in a step 904 the signal independence decision means 403 obtains an observation matrix based upon the sensor information received from the mobile objects. For example, taking the position (x, y, z) that it is desired to obtain as the unknown variable, if position measurement signals like those shown by Equations (1) have been received, then, by Taylor expanding Equations (1) around some point $(x_0, y_0, z_0)$ to first order, the observation matrix G may be expressed by the following Equations (2):

$$\begin{pmatrix} r_1 \\ r_2 \\ \vdots \\ r_N \end{pmatrix} = \begin{pmatrix} \sqrt{(X_1-x_0)^2+(Y_1-y_0)^2+(Z_1-z_0)^2} + \frac{\partial r_1}{\partial(x_1,y_1,z_1)} \\ \sqrt{(X_2-x_0)^2+(Y_2-y_0)^2+(Z_2-z_0)^2} + \frac{\partial r_2}{\partial(x_2,y_2,z_2)} \\ \vdots \\ \sqrt{(X_N-x_0)^2+(Y_N-y_0)^2+(Z_N-z_0)^2} + \frac{\partial r_N}{\partial(x_N,y_N,z_N)} \end{pmatrix} = $$

$$G \begin{pmatrix} x \\ y \\ z \end{pmatrix} + g(x_0, y_0, z_0)$$

(Equations 2)

The number of rows of this observation matrix G is equal to the number of sensor signals that have been acquired, and the number of columns is equal to the number of unknown variables that it is desired to obtain. It is supposed that elements of the observation matrix G are prepared in advance for all the rows that can be acquired. The observation matrix G may be constructed by leaving the elements that correspond to the sensor signals that have been acquired, and by substituting 0 for the other elements. And in a step 905 the signal independence decision means 403 obtains the rank of this observation matrix G. This rank of the observation matrix G obtained in the step 904 is obtained by singular value decomposition or QR decomposition. The rank that is obtained is equal to the number of independent signals.

In the step 906, the signal independence decision means 403 deletes duplicated signals. If several position measurement signals having the same source of emission are present, in other words if the number of unknown variables is larger than the rank of the observation matrix G, then the signal independence decision means 403 specifies the position measurement signals due to the same source of emission, so as only to leave position measurement signals due to sources of emission that are mutually independent. For example, for the elements of the observation matrix G, from the distance $r_1$ between the mobile object and a source of emission that is specified by a first position measurement signal to the distance $r_n$ between the mobile object and a source of emission that is specified by an n-th position measurement signal, the signal independence decision means 403 may calculate the rank of the matrix after deleting all of the elements related to that position measurement signal, one at a time. Since it is possible to decide that those position measurement signals that leave the rank n unchanged are position measurement signals due to sources of emission that are duplicated, by deleting from the observation matrix G all of the rows that correspond to the position measurement signals due to these duplicated sources of emission, an observation matrix G may be obtained in which no position measurement signals due to duplicated sources of emission are included.

Since it is possible to perform position correction if, in a step 907, the number of unknown variables, in other words the number of elements of position that it is desired to obtain, is less than or equal to the number of independent sources of emission, accordingly in a step 908 the signal independence decision means 403 outputs the IDs of the mobile objects that have position measurement signals due to independent sources of emission, and their position measurement signals. The number of unknown variables is equal to the number of variables of position described above that it is desired to obtain, and the number of position measurement signals due to independent sources of emission is equal to the number of columns of the observation matrix G that is finally obtained via the step 906. But if the number of unknown variables is greater than the number of position measurement signals due to independent sources of emission, then in a step 909 the signal independence decision means 403 outputs the result that position correction calculation is not possible.

By repeating (the step 910) this processing for all of the groups that have been formed, it is decided whether or not it is possible to calculate position correction information for the mobile objects that belong to these groups; in other words, the independence of the position measurement signals is determined.

The relationships between the mobile objects are determined according to the processing flow shown in FIG. 5. In the step 305 of the processing flow shown in FIG. 3, the group to which each mobile object belongs as determined up until the present, its independent position measurement signals, and its base line vector are stored in the mobile object classification storage means 123 of the center 121, along with its mobile object ID.

For each group determined by the relationship determination means 122, the position and attitude of the mobile object 101 that has been transmitted from the mobile object 101, the relative position information of the other mobile object 111 with respect to this mobile object 101, the information about position measurement signals, among the sensor information, for which it has been determined that they are position measurement signals due to sources of emission that are independent, and the variable that corresponds to that position measurement signal, are stored in the mobile object classification storage means 123.

The position correction information calculation means 124 of the center 121 calculates the position of each of the mobile objects on the basis of the information stored in the mobile object classification storage means 123. And the position correction information calculation means 124 calculates, as correction information, correction values that are obtained as the differences between the positions of the mobile objects that have been calculated, and the positions of the mobile objects that are already stored, and error estimates for those correction values. This correction information that has been calculated is stored by the mobile object position correction information storage means 126. The variables used in the position calculations and error estimation are all stored by the mobile object classification storage means 123.

An example of position calculation for two mobile objects, i.e. for a mobile object M1 and a mobile object M2, will now be explained. Suppose that the positions of the mobile object M1 and the mobile object M2 are $(x_1, y_1, z_1)$ and $(x_2, y_2, z_2)$ respectively. Let it be supposed that the mobile object M1 receives, from a first source of signal emission, information $r_1$ about the distance between that first source of signal emission and the mobile object M1, and, from a second source of signal emission, information $r_2$ about the distance between that second source of signal emission and the mobile object M1. And let it be supposed that the mobile object M2 receives, from a third source of signal emission, information $r_3$ about the distance between that third source of signal emission and the mobile object M2, and, from a fourth source of signal emission, information $r_4$ about the distance between that fourth source of signal emission and the mobile object M2. Moreover, let it be supposed that the mobile object M2 is able to measure the relative position of the mobile object M1. And suppose that the value of the relative distance between the mobile object M2 and the mobile object M1 is L. Suppose that the base line vector between the mobile object M1 and the mobile object M2 is (dx, dy, dz). Then, in order to obtain the position $(x_1, y_1, z_1)$ of the mobile object M1 and the position $(x_2, y_2, z_2)$ of the mobile object M2, the simultaneous equations given by Equations (3) should be solved:

$$\begin{cases} r_1 = \sqrt{(X_1-x_1)^2+(Y_1-y_1)^2+(Z_1-z_1)^2} \\ r_2 = \sqrt{(X_2-x_1)^2+(Y_2-y_1)^2+(Z_2-z_1)^2} \\ r_3 = \sqrt{(X_3-x_2)^2+(Y_3-y_2)^2+(Z_3-z_2)^2} \\ r_4 = \sqrt{(X_4-x_2)^2+(Y_4-y_2)^2+(Z_4-z_2)^2} \\ L = \sqrt{(x_2-x_1)^2+(y_2-y_1)^2+(z_2-z_1)^2} \\ \begin{pmatrix} x_2 \\ y_2 \\ z_2 \end{pmatrix} = \begin{pmatrix} x_1 \\ y_1 \\ z_1 \end{pmatrix} + \begin{pmatrix} dx \\ dy \\ dz \end{pmatrix} \end{cases}$$ (Equations 3)

The error estimate of the positions calculated from Equations (3) is given according to Equations (4), by Taylor expansion of Equations (3) to the first order about the point $(x_0, y_0, z_0)$:

$$\begin{pmatrix} r_1 \\ r_2 \\ r_3 \\ r_4 \\ L \\ dx \\ dy \\ dz \end{pmatrix} = \begin{pmatrix} \sqrt{(X_1-x_0)^2+(Y_1-y_0)^2+(Z_1-z_0)^2} + \frac{\partial r_1}{\partial(x_1,y_1,z_1)} \\ \sqrt{(X_2-x_0)^2+(Y_2-y_0)^2+(Z_2-z_0)^2} + \frac{\partial r_2}{\partial(x_1,y_1,z_1)} \\ \sqrt{(X_3-x_0)^2+(Y_3-y_0)^2+(Z_3-z_0)^2} + \frac{\partial r_3}{\partial(x_2,y_2,z_2)} \\ \sqrt{(X_4-x_0)^2+(Y_4-y_0)^2+(Z_4-z_0)^2} + \frac{\partial r_4}{\partial(x_2,y_2,z_2)} \\ \sqrt{(x_2-x_0)^2+(y_2-y_0)^2+(x_2-z_0)^2} + \frac{\partial L}{\partial(x_1,x_2,x_3)} \\ x_2-x_0+\frac{\partial dx}{\partial x_1} \\ y_2-y_0+\frac{\partial dy}{\partial x_1} \\ z_2-z_0+\frac{\partial dz}{\partial x_1} \end{pmatrix}$$ (Equations 4)

$$= G \begin{pmatrix} x_1 \\ y_2 \\ z_1 \\ x_2 \\ y_2 \\ z_2 \end{pmatrix} + g(x_0, y_0, z_0)$$

By employing the observation matrix G included in Equations (4), the variance of the errors of the observation values is calculated as the variance of the errors of the distances and so on observed, according to $\sigma=(GG^T)^{-1}$.

By applying a probability model filter such as a Kalman filter or the like to the observation matrix G given by Equations (4) and to the variance σ of the error described above, an estimate of the error in the position calculated from Equations (3) may be obtained.

The communication means 125 of the center 121 distributes to the mobile object 101 the correction information stored by the mobile object position correction information storage means 126 after the calculation by the position correction information calculation means 124. To all of the correction information obtained for the position of each of the mobile objects that is a subject of correction, the mobile object ID of that mobile object is assigned. Each of the mobile objects that has been able to receive distribution of the correction information from the center 121 specifies the correction information that is to be used for position correction on the basis of the mobile object IDs assigned to the distributed correction information. And each of the mobile objects recalculates its position for a second time on the basis of this correction information.

Along with the correction values, the mobile object 101 receives the error variance information from the center 121 as position correction information, and this position correction information can be used during location estimation internally to the mobile object 101. As for example described in Japanese Laid-Open Patent Publication 2009-150722, error variance information becomes necessary for the calculation of the probability of existence of a mobile object.

Second Embodiment

Figure 9:
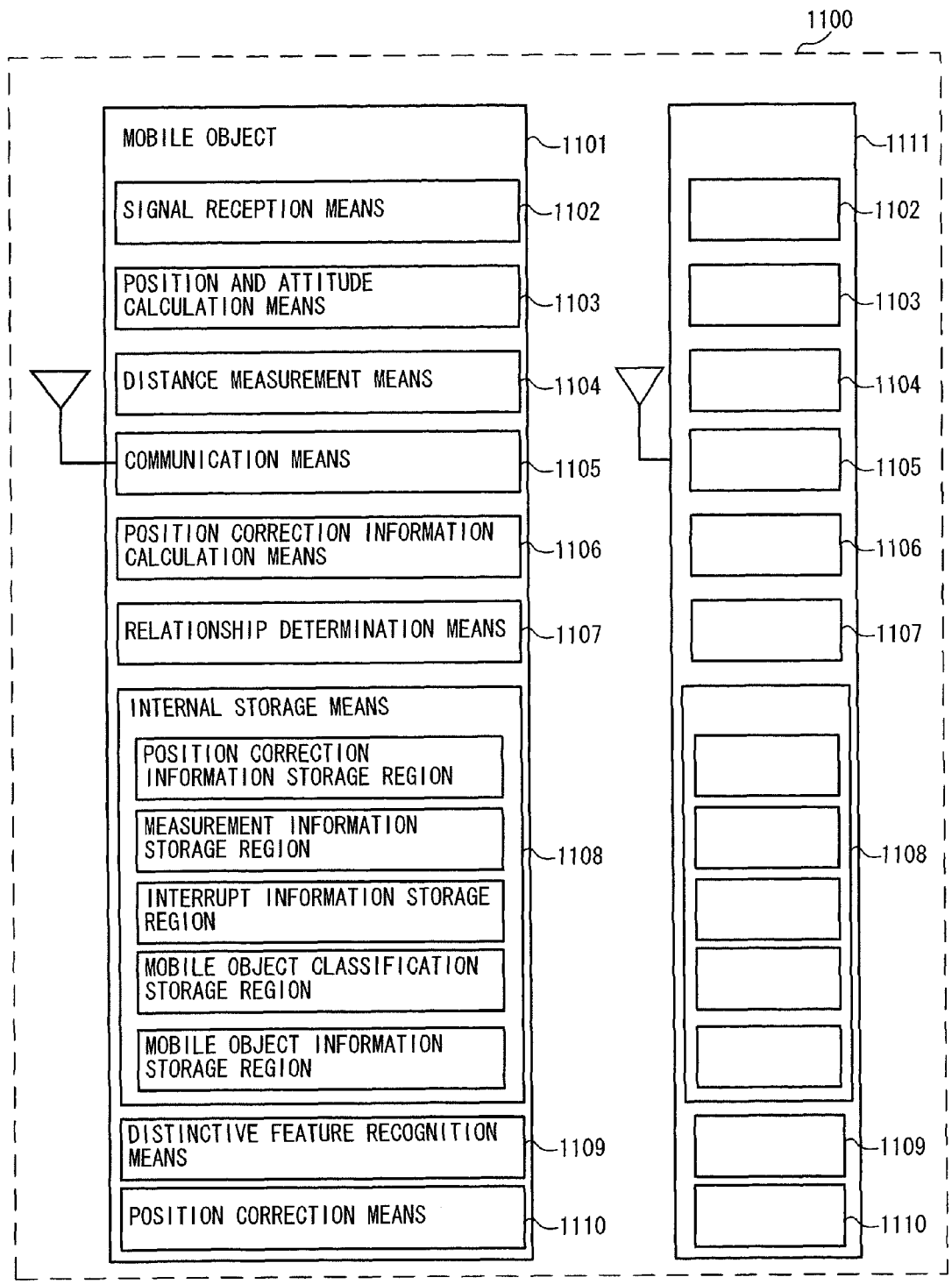
FIG. 9 is a structural diagram of a location estimation system in which relationship determination means are provided to the mobile objects.

With the location estimation system 100 of the first embodiment described above, the relationship determination means 122 is provided in the center 121. However as a second embodiment, as shown in FIG. 9, a location estimation system 1100 will be explained in which a relationship determination means 1107 is provided to each of the mobile objects 1101. Since, in this second embodiment, each of the mobile objects 1101 includes a relationship determination means 1107, accordingly it becomes possible to perform position correction locally to the mobile objects 1101. Therefore it is possible to enhance the positional accuracy in a situation such as a big city environment, in which vehicles of various types come and go, and moreover in which there is a possibility of interruption of communication between the vehicles and the center.

This location estimation system 1100 according to the second embodiment is different from that of the first embodiment, in the aspect that, while it includes a plurality of mobile objects, there is no requirement for any center. FIG. 9 shows the structure of one of the mobile objects 1101 of this embodiment. This mobile object 1101 includes: a signal reception means 1102 that acquires sensor information such as a position measurement signal or the like; a position and attitude calculation means 1103 that calculates a position on the basis of this sensor information; a distance measurement means 1104 that measures the relative distance between the mobile object 1101 and another mobile object 1111; a communication means 1105 that communicates information from sensors mounted to this mobile object and the position information that has been calculated; a position correction information storage means 1106 that calculates position correction information; a relationship determination means 1107 that determines linkage (association) or the like between this mobile object 1101 and the other mobile object 1111 on the basis of whether or not it is possible for their relative distance to be measured by this mobile object 1101 itself or by the other mobile object 1111; an internal storage means 1108 that has a position correction information storage region, a measurement information storage region, an interrupt information storage region, a mobile object classification storage region, and a mobile object information storage region; a distinctive feature recognition means 1109 that recognizes a distinctive feature of the other mobile object 1111 to which the relative distance is measured by the distance measurement means 1104; and a position correction means 1110 that corrects the position calculated by the position and attitude calculation means 1103.

Position correction information calculated by the position correction means 1106 is stored in the position correction information storage region of the internal storage means 1108. Sensor information acquired by the signal reception means 1102 and the results of measurement by the distance measurement means 1104 are stored in the measurement information storage region of the internal storage means 1108. Values partway through transmission to the other mobile object 1111 are stored in the interrupt information storage region of the internal storage means 1108. Information about the groups of mobile objects for which associations have been determined upon by the relationship determination means 1107 is stored in the mobile object classification storage region of the internal storage means 1108. And information about the other mobile object 1111 is stored in the mobile object information storage region of the internal storage means 1108.

Since the signal reception means 1102, the position and attitude calculation means 1103, the distance measurement means 1104, the distinctive feature recognition means 1109, and the position correction means 1110 of this embodiment are respectively the same as the signal reception means 102, the position and attitude calculation means 103, the distance measurement means 104, the distinctive feature recognition means 107, and the position correction means 109 of the first embodiment, accordingly explanation thereof will be omitted.

The signal reception means 1102 of each of the mobile objects is endowed with the function of receiving GPS position measurement signals, and it will be supposed that the times managed by each of the mobile objects are synchronized with GPS time.

Figure 10:
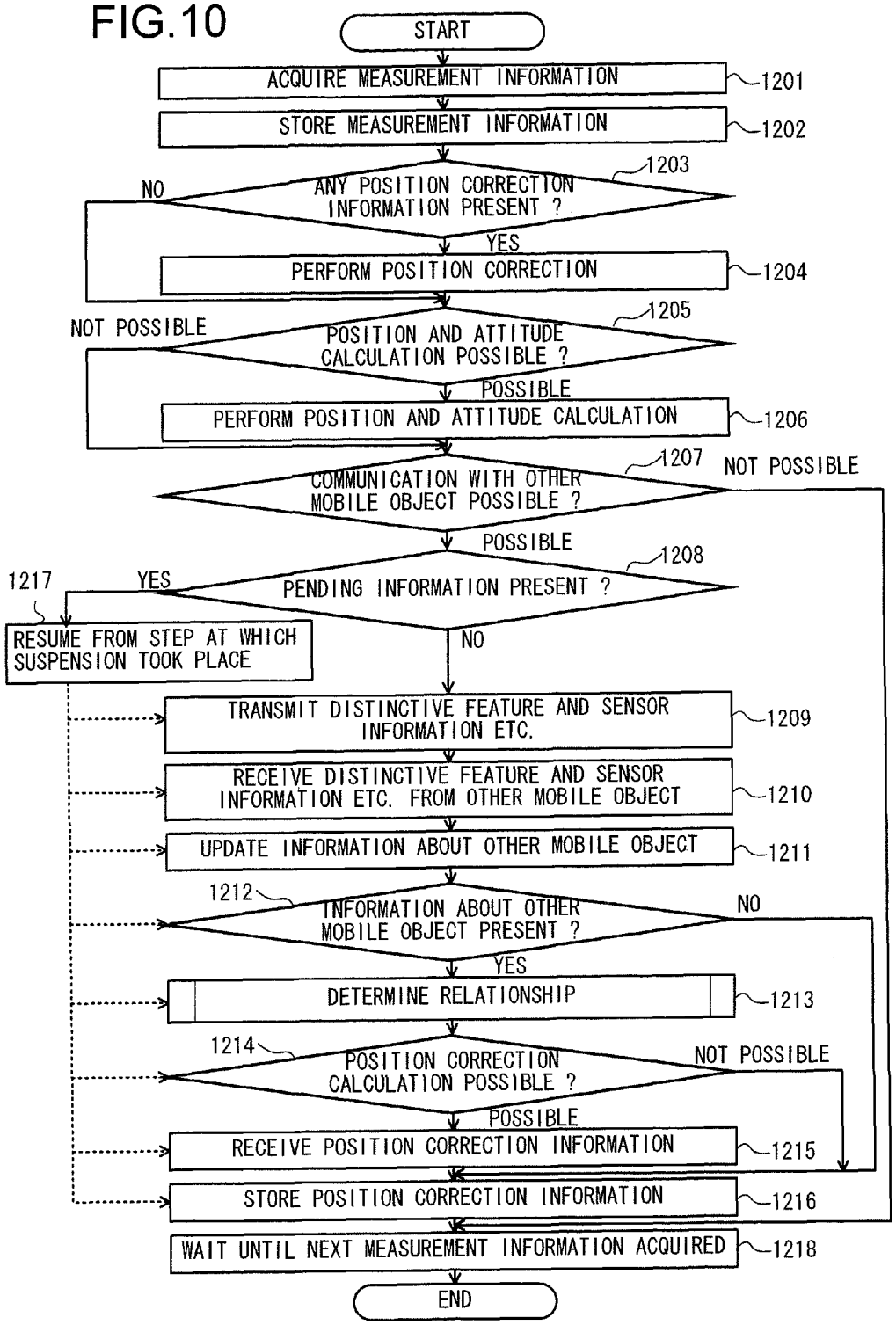
FIG. 10 is a flow chart showing the flow of processing in one of the mobile objects.

FIG. 10 shows the location estimation processing flow of the mobile object 1101. The signal reception means 1102 of the mobile object 1101 acquires sensor information such as position measurement signals and so on obtained from the sensors and the like on a predetermined cycle. The distinctive feature recognition means 1109 scans the vicinity around the mobile object 1101, and, in a similar manner to the case of the distinctive feature recognition means 107 of the first embodiment, searches for distinctive features of the other mobile object 1111, and recognizes distinctive amounts that include these distinctive features and the direction of the other mobile object with respect to this mobile object 1101. In a step 1201, this relative distance to the distinctive feature included in these distinctive amounts is measured by the distance measurement means 1104.

In a step 1202, the sensor information that was acquired, the relative distance that was measured, and also the distinctive amounts that were recognized in the step 1201 are stored as measurement information in the measurement information storage region of the internal storage means 1108. Even if any information stored in the measurement information storage region remains from the previous episode, it is overwritten.

Then in a step 1203 the position correction means 1110 checks whether or not there is any position correction information in the position correction information storage region of the internal storage means 1108, and if there is, then the flow of control proceeds to a step 1204 in which the current position is corrected by using that position correction information. But, if there is no such position correction information, then the flow of control is transferred to a step 1205. In this step 1205, the position and attitude calculation means 1103 makes a decision as to whether or not it is possible to calculate the position and attitude using the measurement information stored in the step 1202. If it is possible, then in a step 1206 the position and attitude calculation means 1103 calculates the position and attitude. The details of this calculation are the same as those of the calculation by the position and attitude calculation means 103 of the first embodiment. But if it is not possible, then the flow of control is transferred to a step 1207.

In this step 1207, the communication means 1105 of the mobile object 1101 decides whether or not communication between the mobile object 1101 and the other mobile object 1111 is possible. The communication means 1105 of the mobile object 1101 transmits a signal only requesting a response to the other mobile object 1111, and, if a response has been received from the other mobile object 1111 within a fixed time period, then it decides that communication with the other mobile object 1111 is possible, while if no response has thus been received, then it decides that communication is not possible. And if the communication means 1105 of the mobile object 1101 has received a request from the other mobile object 1111 for a response, then in this step 1207 it transmits a response to the other mobile object 1111 that is the source of this request. But if communication with the other mobile object 1111 is not possible, then the flow of control is transferred to a step 1218, and this processing waits until the measurement information is acquired in the next episode.

If communication with the other mobile object 1111 is possible, then in a step 1208 a decision is made as to whether or not any information is present in the interrupt information storage region of the internal storage means 1108 relating to processing that remains over from the previous processing episode. If there is no such information, then in a step 1209 the sensor information stored in the step 1202, the mobile object ID of this mobile object 1101 itself, the relative distance between the other mobile object 1111 and this mobile object 1101 that was recognized by the distinctive feature recognition means 1109, the distinctive amounts, and the time points that those items of information were acquired, are transmitted by the communication means 1105 of the mobile object 1101 to the other mobile object 1111. As previously described, the GPS time point is employed for the time point.

Figure 11:
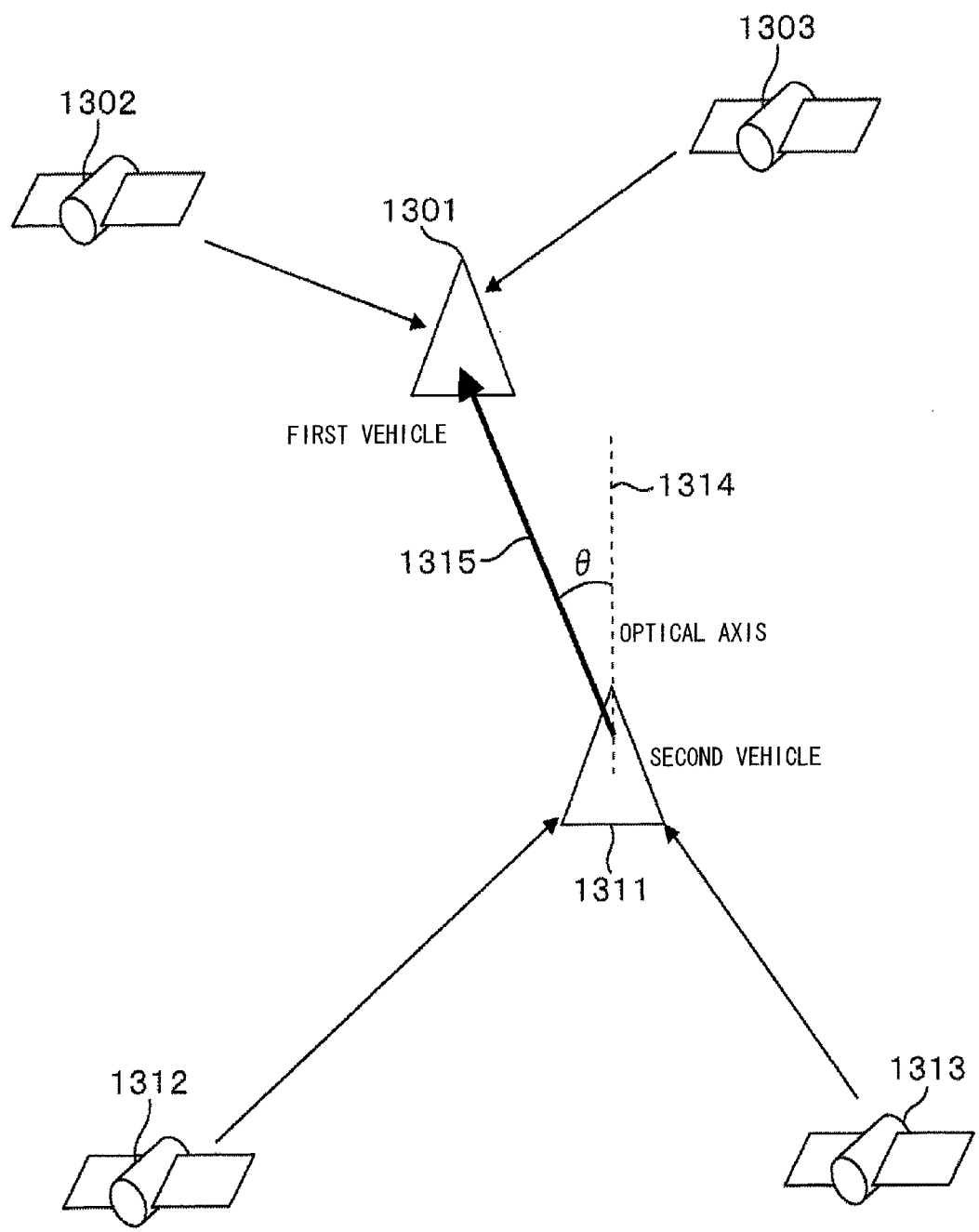
FIG. 11 shows an example of application of the location estimation system of the present invention.

By the processing flow of FIG. 11 being executed in the other mobile object 1111 as well, in the step 1209, similarly to the case for the mobile object 1101, the sensor information, the mobile object ID, the relative distance, the distinctive amounts, and the time points that those items of information were acquired are transmitted by the communication means 1105 of the mobile object 1111 to the mobile object 1101. And in the mobile object 1101, in a step 1210, when they are transmitted by the other mobile object 1111, the sensor information, the mobile object ID, the relative distance, the distinctive amounts, and the time points that those items of information were acquired are received by the communication means 1105 of the mobile object 1101. Then, in a step 1211, the sensor information and the time point that it was acquired received by the communication means 1105 of the mobile object 1101 from the other mobile object 1111, and also information about the relative distance between the other mobile object 1111 and the mobile object 1101 and the distinctive amounts and so on recognized by the distinctive feature recognition means 1109 in the vicinity around the mobile object 1101, are stored in the mobile object information storage region of the internal storage means 1108 of the mobile object 1101. After some fixed time period or greater has elapsed from its being stored, the information about the other mobile object 1111 is deleted. And if information corresponding to the same mobile object ID exists, that information is overwritten.

Next in a step 1212 a decision is made as to whether or not any information from the other mobile object 1111 is stored in the mobile object information storage region by the internal storage means 1108 of the mobile object 1101. If no information from the other mobile object 1111 is stored, in other words if either within the fixed time period no information has been received from the other mobile object 1111, or at least one of the position information and the distinctive amounts for the other mobile object 1111 is not included in the information that has been received, then the flow of control is transferred to a step 1216, and the internal storage means 1108 stores "no position correction information" in the position correction information storage region.

If information received from the other mobile object 1111 is stored, then the flow of control proceeds to a step 1213, in which a determination is made by the relationship determination means 1107 of the relationship of the other mobile object 1111 corresponding to the information that has been received and stored. And in a step 1214, for the other mobile object 1111 for which there is a relationship, the position correction information calculation means 1106 obtains the number of position measurement signals due to independent sources of emission, and the number of unknown variables needed for position correction, in the position measurement signal included in this received information. The number of position measurement signals due to independent sources of emission and the number of unknown variables needed for position correction that have been obtained are compared together, and, if the number of position measurement signals due to independent sources of emission is less than the number of unknown variables needed for position correction, then the position correction information calculation means 1106 decides that it is not possible to calculate position correction information. But if the number of position measurement signals due to independent sources of emission is equal to or greater than the number of unknown variables needed for position correction of the mobile object 1101, then the position correction information calculation means 1106 decides that it is possible to calculate position correction information.

If in the step 1214 it is decided that calculation of position correction information by the position correction information calculation means 1106 is not possible, then the flow of control is transferred to the step 1216, in which the internal storage means 1108 stores "no position correction information" in its position correction information storage region. But if it is decided that calculation of position correction information is possible, then the flow of control continues to a step 1215, in which the position correction information calculation means 1106 calculates position correction information. After position correction information has been calculated in the step 1215, in a step 1216 the internal storage means 1108 stores this position correction information in its position correction information storage region. In a step 1218 this flow of control waits until the next episode of measurement information acquisition, and then the processing from the step 1201 is repeated.

On the basis of the position correction information that has been stored in this manner, since the position is corrected in the step 1204 when the next processing episode arrives, accordingly the position measurement accuracy is enhanced. With regard to the processing of the step 1207 and subsequently, an interrupt may be raised at any time point when an opportunity arises for measurement information acquisition, and the state of processing at that time point is preserved. The preservation information relating to such remaining unfinished processing that has been saved is stored in the interrupt information storage region of the internal storage means 1108, and then the flow of control returns to the step 1201. Subsequently, when the flow of control has reached the step 1208 again, if it is decided that preservation information is present in the interrupt information storage region of the internal storage means 1108, then the processing is resumed from the step at which it was suspended on the basis of this preservation information (the step 1217). The location estimation processing in the other mobile object 1111 also operates in a similar way to the processing described above.

As previously described, the signal reception means 1102, the position and attitude calculation means 1103, the distance measurement means 1104, the distinctive feature recognition means 1109, and the position correction means 1110 of the mobile object 1101 are the same as the signal reception means 102, the position and attitude calculation means 103, the distance measurement means 104, the distinctive feature recognition means 107, and the position correction means 109 of the mobile object 101 of the first embodiment.

The internal storage means 1108 corresponds to the internal storage means 108 of the first embodiment, and also to the mobile object classification storage means 123, mobile object position correction information storage means 126, and mobile object information storage means 127 in the center 121 in the first embodiment. In this correspondence, the mobile object classification storage region, the position correction information storage region, and the mobile object information storage region are provided in the internal storage means 1108. The following explanation of the operation of the relationship determination means 1107 corresponds to the above described explanation of the operation of the relationship determination means 122 of the first embodiment, and also of the association determination means 402, the signal independence decision means 403, and the base line vector calculation means 404 included therein. Accordingly, the mobile object classification storage region, the position correction information storage region, and the mobile object information storage region that appear in the explanation of the relationship determination means 1107 respectively correspond to the mobile object classification storage means 123, the mobile object position correction information storage means 126, and the mobile object information storage means 127 of the first embodiment.

In the mobile object 1101, the communication means transmits the information obtained by the communication means 1105, the signal reception means 1102, the position and attitude calculation means 1103, and the distance measurement means 1104 to the other mobile object 1111, and also receives information sent from the other mobile object 1111.

The internal storage means of the mobile object 1101 stores the position correction information obtained in the step 1215 described above in its position correction information storage region. This information that has been stored is deleted after correction of the position has been performed in the step 1204.

By making decisions as to the relationships of a plurality of other mobile objects 1111, the relationship determination means 1107 in the mobile object 1101 classifies those mobile objects into groups that are mutually correlated.

The structure of the relationship determination means 1107 is the same as that of the relationship determination means 122 in the first embodiment, and the flow of processing therein is also the same as the relationship determination processing shown in FIG. 5. However, in the step 717 of the association determination processing in FIG. 7, the results that have been grouped together in the step 716 are stored in the mobile object classification storage region of the internal storage means 1108.

The groups of mobile objects, independent signals, and base line vectors calculated during the relationship determination processing by the relationship determination means 1107 in the step 1213 are stored by the internal storage means 1108 in its mobile object classification storage region. For each group that has been determined by the relationship determination means 1107, in the mobile object classification storage region of the internal storage means 1108, there are stored the positions and attitudes of the other mobile objects 1111 that have been transmitted by those other mobile objects 1111 and their distance information, and, among their sensor information, information about the signals that it has been decided are independent signals and about the unknown variables corresponding to those signals.

The position information calculation means 1106 calculates the positions of the various mobile objects on the basis of the information stored in the mobile object classification storage region of the internal storage means 1108, and calculates correction values obtained as their differences from positions that are already stored, and error estimates for these correction values. The method by which these calculations are performed is the same as in the first embodiment.

A concrete example will now be explained with reference to FIG. 11. FIG. 11 shows an example to which the location estimation system according to the present invention has been applied. In this example it is supposed that the mobile objects are vehicles, that GPS receivers that are capable of determining the time points of reception of GPS signals are mounted to the signal reception means 1102 of these vehicles, and that the sources of emission are GPS satellites and the position measurement signals are GPS signals. It is supposed that GPS signals from a first GPS satellite 1302 and from a second GPS satellite 1303 are captured by the first vehicle 1301 at a time point h1. In a similar manner, it is supposed that GPS signals from a third GPS satellite 1312 and from a fourth GPS satellite 1313 are captured by the second vehicle 1311 at a time point h2. Moreover it is supposed that, in the second vehicle 1311, the first vehicle 1301 is observed by a stereo camera at a location that is separated by a distance L upon a line 1315 that is angled by a certain relative angle θ with respect to the optical axis 1314 of the camera, and that the vehicle registration number on the number plate of this first vehicle 1301 is recognized. Furthermore it is supposed that, in the first vehicle 1301, the distance information r1 from the first GPS satellite 1302 to the first vehicle 1301 is received, and also that the distance information r2 from the second GPS satellite 1303 to the first vehicle 1301 is received. Yet further it is supposed that, in the second vehicle 1311, the distance information r3 from the third GPS satellite 1312 to the second vehicle 1311 is received, and also that the distance information r4 from the fourth GPS satellite 1313 to the second vehicle 1311 is received.

While this state is maintained, it is not possible for either the first vehicle 1301 or the second vehicle 1311 to estimate the position $(x_1, y_1, z_1)$ of the first vehicle 1301 or the position $(x_2, y_2, z_2)$ of the second vehicle 1311 on its own. However, by vehicle-to-vehicle communication being performed between the communication means 1105 of the first vehicle 1301 and the communication means 1105 of the second vehicle 1311, the first vehicle 1301 and the second vehicle 1311 can mutually communicate their GPS reception information including the reception time points of the GPS signals at the respective vehicles, and also their distinctive amounts, including the vehicle registration numbers of those vehicles and the vehicles in the vicinity around each vehicle that the vehicle has recognized. And, by the relationship determination means 1107 of both the first vehicle 1301 and the second vehicle 1311 starting to operate and performing processing for base line vector calculation, a base line vector is calculated from the relative distance that is measured by the stereo camera of the second vehicle 1311.

The relationship determination means 1107 of the first vehicle 1301 checks that the vehicle registration number of the recognized vehicle included in the distinctive amounts received from the second vehicle 1311 and its own vehicle registration number that the first vehicle 1301 holds as data agree with one another, and recognizes that the second vehicle 1311 belongs to the same group as the first vehicle 1301. In a similar manner, the relationship determination means 1107 of the second vehicle 1311 checks that the vehicle registration number of the vehicle recognized by its stereo camera and the vehicle registration number of the first vehicle 1301 included in the distinctive amounts received from the first vehicle 1301 agree with one another, and recognizes that the first vehicle 1301 belongs to the same group as the second vehicle 1311. And, according to the PN codes of the GPS signals received by each of the vehicles, it is decided that first GPS satellite 1302, the second GPS satellite 1303, the third GPS satellite 1312, and the fourth GPS satellite 1313 are all mutually independent satellites. From these results, the position of the two vehicles may be obtained by solving the simultaneous equations shown as Equations (5) below, and their values are stored as position correction information:

$$\begin{cases} r_1 = \sqrt{(X_1 - x_1)^2 + (Y_1 - y_1)^2 + (Z_1 - z_1)^2} + s_1 \\ r_2 = \sqrt{(X_2 - x_1)^2 + (Y_2 - y_1)^2 + (Z_2 - z_1)^2} + s_1 \\ r_3 = \sqrt{(X_3 - x_2)^2 + (Y_3 - y_2)^2 + (Z_3 - z_2)^2} + s_2 \\ r_4 = \sqrt{(X_4 - x_2)^2 + (Y_4 - y_2)^2 + (Z_4 - z_2)^2} + s_2 \\ L = \sqrt{(x_2 - x_1)^2 + (y_2 - y_1)^2 + (z_2 - z_1)^2} \\ \begin{pmatrix} x_2 \\ y_2 \\ z_2 \end{pmatrix} = \begin{pmatrix} x_1 \\ y_1 \\ z_1 \end{pmatrix} + \begin{pmatrix} dx \\ dy \\ dz \end{pmatrix} \\ dx = L\cos\theta \\ dy = L\sin\theta \\ dz = L\sin\psi \\ s_1 - s_2 = c(h_1 - h_2) \end{cases} \quad \text{(Equations 5)}$$

Equations (5) include the angle of deviation θ of the optical axis of the stereo camera from the horizontal direction, the angle of deviation ψ of the optical axis of the stereo camera from the vertical direction, and the speed of light c.

In this manner, even if it is not possible to perform position measurement because there are not enough signals received from the GPS satellites by any single one of the mobile bodies, it becomes possible to increase the position measurement accuracy, because it becomes possible to perform position calculation by using the location estimation system.

In all of the embodiments of the present invention described above, the present invention can still be applied even if "unit" is replaced by "means".

The above described embodiments are examples, and various modifications can be made without departing from the scope of the invention.

What is claimed is:

1. A location estimation system, comprising:
   a position measurement unit that receives position measurement signals from a plurality of sources of emission, and calculates position information that includes a first position of a first mobile object and an error estimate of the first position;
   a distance measurement unit that measures a distance from the first mobile object and to a second mobile object that is different from the first mobile object;
   a distinctive feature recognition unit that recognizes a distinctive feature of the second mobile object;
   a transmission unit that transmits the position measurement signals and the position information;
   a relationship determination unit that acquires relative position of the second mobile object with respect to the first mobile object based upon the distance, determines presence or absence of a relationship between the first mobile object and the second mobile object based upon the relative position, and, in case of the presence of the relationship, selects position measurement signals, among the position measurement signals received by the second mobile object, from sources of emission that are different from the sources of emission of the position measurement signals received by the first mobile object;
   a calculation unit that calculates a second position for the first mobile object based upon the position measurement signals received by the first mobile object and the position measurement signals selected by the relationship determination unit, and calculates position correction information based upon the first position and the second position;
   a reception unit that receives the position correction information;

a position correction information storage unit that stores the position correction information received by the reception unit; and a position correction unit that corrects the first position based upon the position correction information stored by the position correction information storage unit.

2. A location estimation system according to claim 1, wherein the relationship determination unit comprises:

an association determination unit that determines upon the presence or the absence of the relationship, based upon whether or not the distance measured by the distance measurement unit is measured by a measurement device mounted to the first mobile object or to the second mobile object;

a signal independence decision unit that determines upon the independence of the sources of emission of the position measurement signals received by the first mobile object and the position measurement signals received by the second mobile object; and a base line vector calculation unit that calculates a base line vector based upon the relative position.

3. A location estimation system according to claim 2, wherein the association determination unit classifies into a group a plurality of mobile objects that are subjects for the measurement of the distance from the first mobile object by the measurement device mounted to the first mobile object.

4. A location estimation system according to claim 2, wherein, from among the position measurement signals received by the first mobile object and the position measurement signals received by the plurality of mobile objects that are classified into the group by the association determination unit, the signal independence decision unit distinguishes and selects independent position measurement signals for which the sources of emission are mutually different.

5. A location estimation system according to claim 4, wherein the base line vector calculation unit calculates the base line vector if number of the independent position measurement signals selected by the signal independence decision unit is greater than or equal to number needed for position measurement.

6. A location estimation system according to claim 4, wherein, after having distinguished and selected the independent position measurement signals, the signal independence decision unit makes a decision as to whether number of unknown variables, among variables giving positions of the plurality of mobile objects classified into the group classified by the association determination unit, is less than or equal to number of the sources of emission that correspond to the independent position measurement signals.

* * * * *